United States Patent
Hoford et al.

(10) Patent No.: US 12,147,753 B2
(45) Date of Patent: Nov. 19, 2024

(54) CONSTRAINTS-BASED LAYOUT SYSTEM FOR EFFICIENT LAYOUT AND CONTROL OF USER INTERFACE ELEMENTS

(71) Applicant: Google LLC, Mountain View, CA (US)

(72) Inventors: John Hoford, Mountain View, CA (US); Nicolas Roard, San Francisco, CA (US); Romain P. Guy, Mountain View, CA (US)

(73) Assignee: Google LLC, Mountain View, CA (US)

( * ) Notice: Subject to any disclaimer, the term of this patent is extended or adjusted under 35 U.S.C. 154(b) by 807 days.

(21) Appl. No.: 17/129,207

(22) Filed: Dec. 21, 2020

(65) Prior Publication Data
US 2021/0150119 A1    May 20, 2021

Related U.S. Application Data

(63) Continuation of application No. 15/494,349, filed on Apr. 21, 2017, now Pat. No. 11,030,386.
(Continued)

(51) Int. Cl.
*G06F 17/00* (2019.01)
*G06F 8/34* (2018.01)
(Continued)

(52) U.S. Cl.
CPC .............. *G06F 40/106* (2020.01); *G06F 8/34* (2013.01); *G06F 8/38* (2013.01); *G06F 30/392* (2020.01);
(Continued)

(58) Field of Classification Search
CPC . G06F 40/106; G06F 8/34; G06F 8/38; G06F 30/392; G06F 30/398; G06F 40/103; G06F 2111/04; G06T 11/60
See application file for complete search history.

(56) References Cited

U.S. PATENT DOCUMENTS

| | | | |
|---|---|---|---|
| 6,189,132 B1 * | 2/2001 | Heng | G06F 30/398 716/135 |
| 6,785,866 B1 | 8/2004 | Lewis et al. | |

(Continued)

FOREIGN PATENT DOCUMENTS

| | | |
|---|---|---|
| CN | 101523346 | 9/2009 |
| CN | 105468382 | 4/2016 |

(Continued)

OTHER PUBLICATIONS

Apple Inc., "Auto Layout Guide: Working with Constraints in Interface Builder," https://developer.apple.com/library/archive/documentation/UserExperience/Conceptual/AutolayoutPG/WorkingwithConstraintsininterfaceBuidler.html, 2016, 15 pages.
(Continued)

*Primary Examiner* — Mustafa A Amin
(74) *Attorney, Agent, or Firm* — McDonnell Boehnen Hulbert & Berghoff LLP

(57) ABSTRACT

Aspects of the subject technology relate to systems and methods for constraints-based layout and control of user interface (UI) elements. The system receives a first user input indicating an instruction to position a first UI element on a page of the layout application. The system receives a second user input indicating an instruction to position a second UI element on the page. The system receives a third user input indicating an instruction to create a connection from the second UI element to the first UI element. The system generates a layout constraint indicating a spatial relationship between the first UI element and the second UI element based on the connection. The system provides the layout constraint in a layout data file associated with the UI.

19 Claims, 13 Drawing Sheets

Related U.S. Application Data

(60) Provisional application No. 62/337,852, filed on May 17, 2016, provisional application No. 62/337,850, filed on May 17, 2016.

(51) Int. Cl.
*G06F 8/38* (2018.01)
*G06F 30/392* (2020.01)
*G06F 30/398* (2020.01)
*G06F 40/106* (2020.01)
*G06F 40/103* (2020.01)
*G06F 111/04* (2020.01)
*G06T 11/60* (2006.01)

(52) U.S. Cl.
CPC .......... *G06F 30/398* (2020.01); *G06F 40/103* (2020.01); *G06F 2111/04* (2020.01); *G06T 11/60* (2013.01)

(56) References Cited

U.S. PATENT DOCUMENTS

| | | | |
|---|---|---|---|
| 7,522,174 B2 | 4/2009 | Yamamoto et al. | |
| 7,971,154 B2 | 6/2011 | Shaw et al. | |
| 8,086,958 B2 | 12/2011 | Tokunaga et al. | |
| 8,446,430 B2 | 5/2013 | Milne et al. | |
| 8,560,952 B2 | 10/2013 | Collins et al. | |
| 8,839,174 B2* | 9/2014 | Suiter | G06F 30/392 716/137 |
| 2001/0035875 A1 | 11/2001 | Suzuki et al. | |
| 2004/0019852 A1 | 1/2004 | Purvis | |
| 2004/0123238 A1 | 6/2004 | Hefetz et al. | |
| 2004/0268299 A1 | 12/2004 | Lei et al. | |
| 2005/0010922 A1* | 1/2005 | Czajkowski | G06N 5/01 718/102 |
| 2005/0094205 A1* | 5/2005 | Lo | G06F 40/106 358/1.18 |
| 2005/0094206 A1 | 5/2005 | Tonisson | |
| 2005/0172224 A1* | 8/2005 | Kobashi | G06F 40/106 715/205 |
| 2005/0237321 A1 | 10/2005 | Young et al. | |
| 2005/0273746 A1 | 12/2005 | Malhotra et al. | |
| 2006/0048052 A1* | 3/2006 | Lehenbauer | G06F 9/451 715/243 |
| 2006/0150092 A1 | 7/2006 | Atkins | |
| 2006/0156227 A1* | 7/2006 | Hosotsubo | G06F 40/114 715/251 |
| 2006/0174194 A1 | 8/2006 | Miyazawa | |
| 2006/0190811 A1 | 8/2006 | Ohno | |
| 2006/0200759 A1 | 9/2006 | Agrawala et al. | |
| 2006/0225037 A1 | 10/2006 | Glein et al. | |
| 2006/0228654 A1 | 10/2006 | Sanjar et al. | |
| 2007/0002377 A1* | 1/2007 | Tokunaga | G06F 40/103 358/1.18 |
| 2007/0010901 A1* | 1/2007 | Fukui | G06Q 10/04 700/74 |
| 2007/0028165 A1 | 2/2007 | Cole | |
| 2007/0180363 A1 | 8/2007 | Dance | |
| 2007/0208996 A1* | 9/2007 | Berkner | G06F 40/106 706/19 |
| 2007/0211050 A1 | 9/2007 | Ohta | |
| 2007/0266307 A1 | 11/2007 | Panditharadhya et al. | |
| 2008/0016483 A1 | 1/2008 | Chan | |
| 2008/0120316 A1 | 5/2008 | Vion-Dury et al. | |
| 2008/0256439 A1* | 10/2008 | Boreham | G06F 40/103 715/246 |
| 2009/0228291 A1* | 9/2009 | Rothberg | G06Q 10/063 705/348 |
| 2009/0254814 A1* | 10/2009 | Lai | G06F 40/186 715/244 |
| 2009/0265611 A1 | 10/2009 | Sengamedu et al. | |
| 2009/0307576 A1* | 12/2009 | Thomson | G06F 40/174 715/253 |
| 2010/0275152 A1 | 10/2010 | Atkins et al. | |
| 2010/0321391 A1 | 12/2010 | Rubin et al. | |
| 2011/0197124 A1 | 8/2011 | Garaventa | |
| 2011/0239178 A1 | 9/2011 | Yamashita | |
| 2012/0124492 A1* | 5/2012 | Taron | G06F 9/451 715/762 |
| 2012/0162266 A1 | 6/2012 | Douglas et al. | |
| 2012/0290959 A1 | 11/2012 | Quine | |
| 2013/0124981 A1 | 5/2013 | Chao et al. | |
| 2013/0194297 A1* | 8/2013 | Theophil | G06F 40/103 345/660 |
| 2013/0195378 A1 | 8/2013 | Maloney et al. | |
| 2013/0205274 A1 | 8/2013 | Bosshart | |
| 2014/0194297 A1 | 7/2014 | Rothberg et al. | |
| 2015/0012818 A1 | 1/2015 | Reichmann et al. | |
| 2015/0242374 A1 | 8/2015 | Kong et al. | |
| 2015/0370542 A1 | 12/2015 | Wang et al. | |
| 2016/0274670 A1 | 9/2016 | Sugaya | |
| 2016/0292134 A1 | 10/2016 | Elings et al. | |
| 2017/0102927 A1 | 4/2017 | Gunther, Jr. et al. | |
| 2017/0337321 A1 | 11/2017 | Hoford et al. | |
| 2019/0108201 A1 | 4/2019 | Abrahami et al. | |

FOREIGN PATENT DOCUMENTS

| | | |
|---|---|---|
| EP | 1832986 B1 | 9/2007 |
| WO | 2013/071749 | 5/2013 |
| WO | 2016/043729 | 3/2016 |

OTHER PUBLICATIONS

Johnson, Bradley, "Auto Layout Tutorial in iOS 9 Part 1: Getting Started," https://web.archive.org/web/20150923050712/https:www.raywenderlich.com/115440/auto-layout-tutorial-in-ios-9-part-1-getting-started-2, Sep. 22, 2015, 38 pages.

Luanxi, Ji, "Auto Layout and Constraints," Segmentfault, http://https://segmentfault.com/a/1190000004386278, Jan. 28, 2016, 8 pages.

Apple: "Auto Layout Guide: Working with Constraints in Interface Builder," Mar. 21, 2016, retrieved from http://developer.apple.com/library/content/documentation/UserExperience/Conceptual/AutolayoutPG/WorkingwithConstraintsinInterfaceBuilder.html#//apple_ref/doc/uid/TP40010853-CH10-SW1, 10 pages.

International Searching Authority, International Search Report and Written Opinion mailed on Jul. 13, 2017, issued in connection with International Patent Application No. PCT/US2017/028960, filed on Apr. 21, 2017, 17 pages.

International Searching Authority, International Search Report and Written Opinion mailed on Jul. 13, 2017, issued in connection with International Patent Application No. PCT/US2017/028961, filed on Apr. 21, 2017, 15 pages.

Johnson, Bradley, "Auto LayoutTutorial in iOS 9 Part 1: Getting Started," Sep. 22, 2015, retrieved from https://www.raywenderlich.com/15440/auto-layout-tutorial-in-ios-9-part-1-getting-started-2, 32 pages.

* cited by examiner

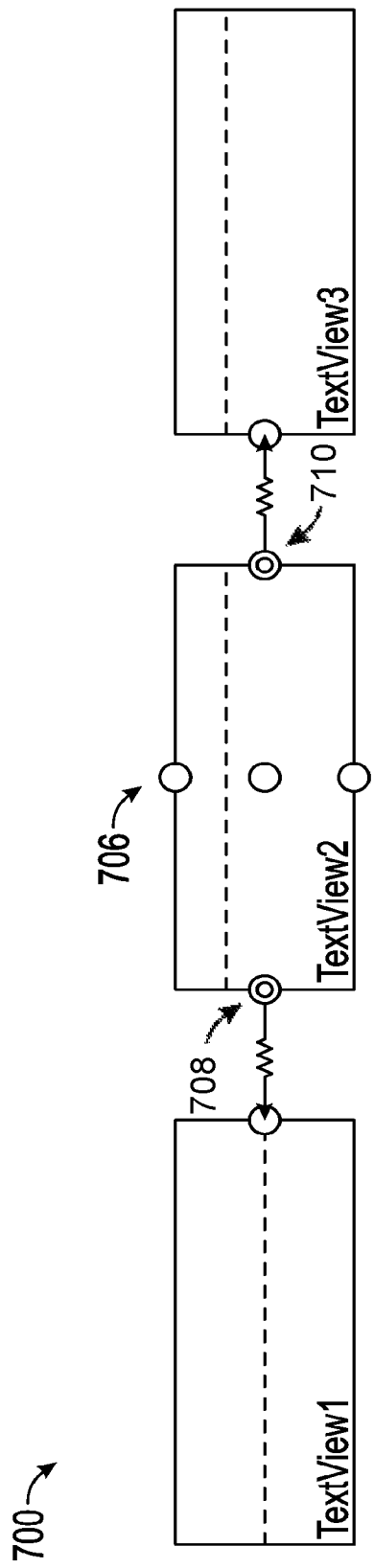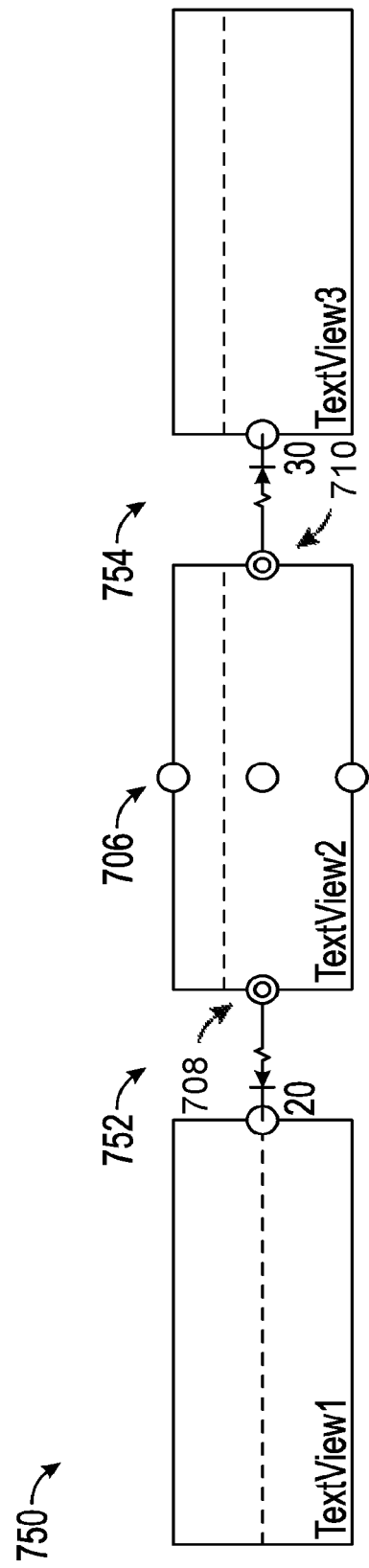
FIG. 7A
FIG. 7B

CONSTRAINTS-BASED LAYOUT SYSTEM FOR EFFICIENT LAYOUT AND CONTROL OF USER INTERFACE ELEMENTS

CROSS-REFERENCE TO RELATED APPLICATIONS

The present application is a continuation of U.S. patent application Ser. No. 15/494,349 filed on Apr. 21, 2017, which claims the benefit of priority from U.S. Provisional Patent Application No. 62/337,850 filed on May 17, 2016, and U.S. Provisional Patent Application Ser. No. 62/337,852 filed on May 17, 2016, the disclosures of which are hereby incorporated by reference in their entirety for all purposes.

BACKGROUND

Field

The present disclosure generally relates to a computer-based layout system for user interface development and deployment, and more particularly to a constraints-based layout system for efficient layout and control of user interface elements.

Description of the Related Art

User interfaces are designed to be able to adapt to various screen conditions such as screen size, screen density, and human language used. Traditional layout systems allow developers to specify how widgets are laid out, and how their layout position will change to adapt to changing screen conditions. However, traditional layout systems can be complex, and can have performance limitations that can make creating user interfaces an undesirably time-consuming process for developers.

The description provided in the background section should not be assumed to be prior art merely because it is mentioned in or associated with the background section. The background section may include information that describes one or more aspects of the subject technology.

SUMMARY

The disclosed subject matter relates to a constraints-based layout system for efficient layout and control of user interface elements. More particularly, constraints-based layout systems and methods are provided that allow developers to more easily and efficiently specify how widgets are laid out, and how their position will change to adapt to those changing and/or variable display conditions (e.g., for various screen sizes, screen densities, and languages). Additional user interface complexity and design options are facilitated.

According to an aspect of the present disclosure, a computer-implemented method is provided. The method includes providing, on a computing device, a layout application for developing a user interface (UI), in which the layout application includes a representation of a page. The method includes receiving first user input via the layout application, in which the first user input indicates an instruction to position a first UI element on the page. The method includes receiving second user input via the layout application, in which the second user input indicates an instruction to position a second UI element on the page. The method includes receiving third user input via the layout application, in which the third user input indicates an instruction to create a connection from the second UI element to the first UI element. The method includes generating a layout constraint indicating a spatial relationship between the first UI element and the second UI element based on the connection. The method also includes providing the layout constraint in a layout data file associated with the UI.

According to an aspect of the present disclosure, a system is provided including one or more processors and a computer-readable storage medium coupled to the one or more processors, the computer-readable storage medium including instructions. The instructions cause the one or more processors to provide, on a computing device, a layout application for developing a UI, in which the layout application includes a representation of a page. The instructions also cause the one or more processors to receive first user input via the layout application, in which the first user input indicates an instruction to position a first UI element on the page. The instructions also cause the one or more processors to receive second user input via the layout application, in which the second user input indicates an instruction to position a second UI element on the page. The instructions also cause the one or more processors to receive third user input via the layout application, in which the third user input indicates an instruction to create a connection from the second UI element to the first UI element. The instructions also cause the one or more processors to generate a layout constraint indicating a spatial relationship between the first UI element and the second UI element based on the connection. The instructions also cause the one or more processors to provide the layout constraint in a layout data file associated with the UI.

According to an aspect of the present disclosure, a non-transitory computer readable storage medium is provided including instructions that, when executed by a processor, cause the processor to perform a method. The method includes providing, on a computing device, a layout application for developing a UI, in which the layout application includes a representation of a page. The method includes receiving first user input via the layout application, in which the first user input indicates an instruction to position a first UI element on the page. The method includes receiving second user input via the layout application, in which the second user input indicates an instruction to position a second UI element on the page. The method includes receiving third user input via the layout application, in which the third user input indicates an instruction to create a connection from the second UI element to the first UI element. The method includes generating a layout constraint indicating a spatial relationship between the first UI element and the second UI element based on the connection. The method also includes providing the layout constraint in a layout data file associated with the UI.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 5 through 9 illustrate schematic diagrams of example layout constraints.

Figure 1:
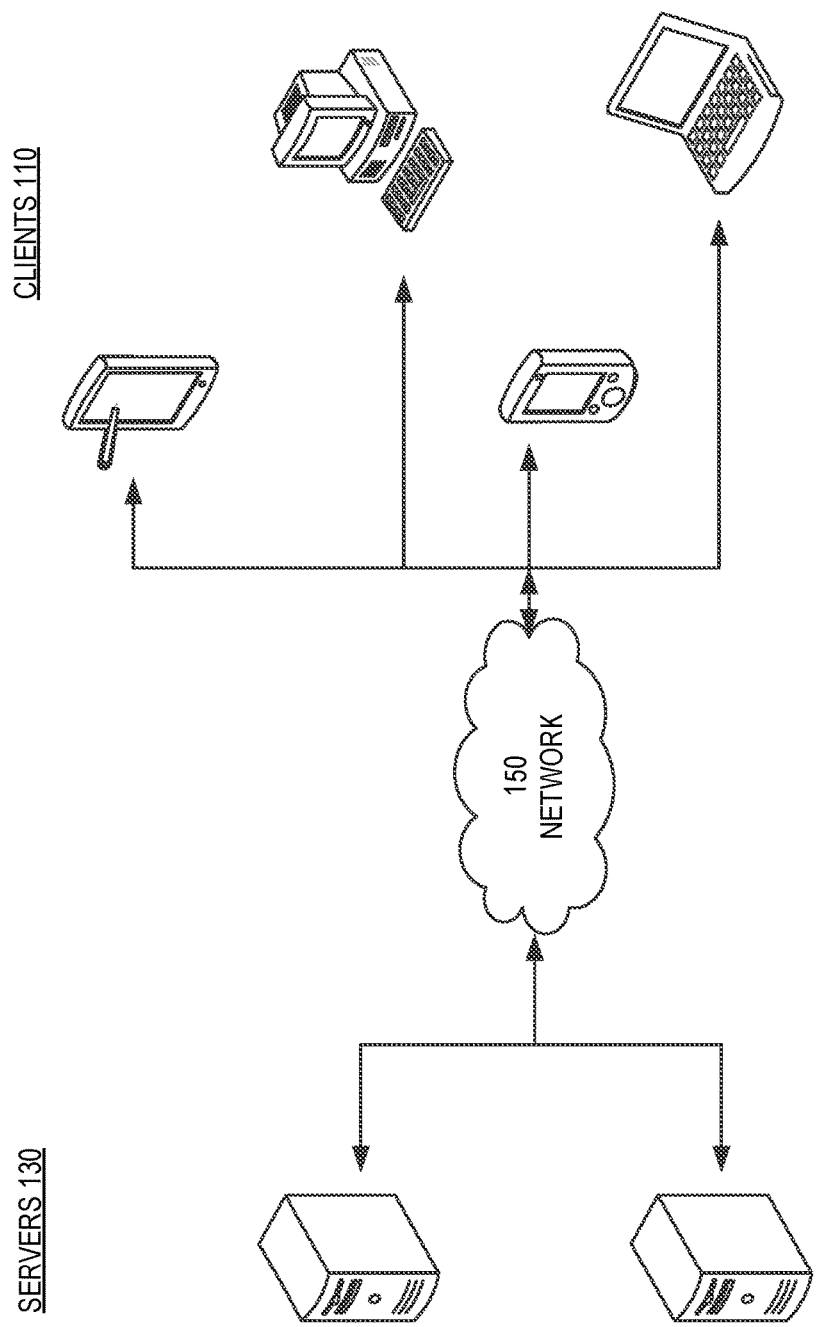
FIG. 1 illustrates an example architecture for a layout tool suitable for practicing some implementations of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

As used herein, the term "widget" may refer to an application, or a component of an application, that executes performance of a function of the application or provides access to a service associated with the application. As used herein, the term "anchor" may refer to an element of a widget used to establish a connection with another object, such as another widget, on a page.

General Overview

Traditional layout systems have been developed based on the Cassowary algorithm that discloses the use of constraint systems for user interfaces. Specifically, the constraint systems are solved using a linear system solver based on the algorithm, thereby allowing iterative solutions for real-time use of the user interfaces. However, there is a problem with traditional UI layout systems. UIs are composed of multiple display objects, often called "widgets." Determining how to position these widgets on a display screen while taking into account complex considerations such as various device screen sizes, display screen densities, and/or various human languages included in the display, is a complex task. Existing layout systems that express these layout considerations are not minimizing this complexity to the developers. In some instances, these traditional layout systems fully expose the linear system to developers, resulting in complex and burdensome development time to predict behaviors for a UI layout. Such exposure also creates degrading performance issues in the layout systems and adversely impacts the user experience of developers due to difficult input requirements by the layout systems. For example, such layout systems require developers to specify layouts by essentially writing linear equations, a burdensome task for developers. Other traditional layout systems compartmentalize various functions to specific use cases (e.g. perform layout of content as a line of widgets, organize layout as a grid, etc.) thereby creating an unnecessary burden on developers to use multiple components before reaching a final layout.

The disclosed technology provides for representing complex constraints on widgets using a small set of common rules allowing developers to represent arbitrary relationships between widgets (e.g., one-to-one, series chain). The system is based on a generic linear equation solver, facilitating internally flexibility and adaptability. The specific set of rules defined provide better performances and predictability, and allow for the expression of widget position in a simpler manner rather than directly creating linear equations. In addition, by moving the entire layout process in a single place, better layout performances (complex view hierarchies often found on mobile operating systems are not necessary anymore) are achieved, as well as better flexibility and new animation capabilities.

The disclosed technology addresses the problem in traditional layout systems, which specifically arise in the realm of computer technology, by providing a solution also rooted in computer technology, namely, by defining a higher-level set of constraints used to express layout relations. The layout system of the present disclosure is based upon a specifically created, efficient implementation of the Cassowary algorithm. One of the distinguishing features between the layout system of the present disclosure and the traditional layout systems is that the Cassowary approach used in the traditional layout system requires developers to specify layouts by essentially writing linear equations, whereas the present disclosure provides a graphical approach to the layout development and deployment. In this regard, the layout system of the present disclosure removes the burden of writing linear equations from developers.

In addition to the basic layout capabilities of the layout system of the present disclosure, the disclosed technology allows complete separation between the widgets hierarchy to the way widgets are positioned. This has a wide ranging impact in terms of performance as well as flexibility. For example, traditional layout systems provide view hierarchies that tend to be deep and complex due to the layout, whereas the layout system of the present disclosure removes this requirement. Additionally, the layout system of the present disclosure provides concept virtual containers/helpers as well as animating elements that yield greater flexibility in the layout system as they share the same "scene."

The disclosed technology further provides improvements to the functioning of the computer itself because: (1) a minimal set of different constraints is needed, thus requiring less computer operations and memory resources; (2) it is much simpler to communicate this solution to users rather than requiring users to provide an input identifying written linear equations; (3) it is predictable—a critical point, both from a user perspective, and from a performance point of view; and (4) it allows large flexibility in the type of layouts supported.

Example System Architecture

FIG. 1 illustrates an example architecture 100 for efficient layout and control of user interface elements based on a constraints-based layout system during development and deployment of user interfaces. The architecture 100 includes servers 130 and clients 110 connected over a network 150.

One of the many servers 130 is configured to host an application server and/or a web server. The servers 130 can be any device having an appropriate processor, memory, and communications capability for hosting the application server and/or the web server. The constraints-based layout system is accessible on various clients 110. In some aspects, the constraints-based layout system may be downloaded from the server 130 over the network 150, and installed on the client 110. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Constraints—Based Layout System

Figure 2:
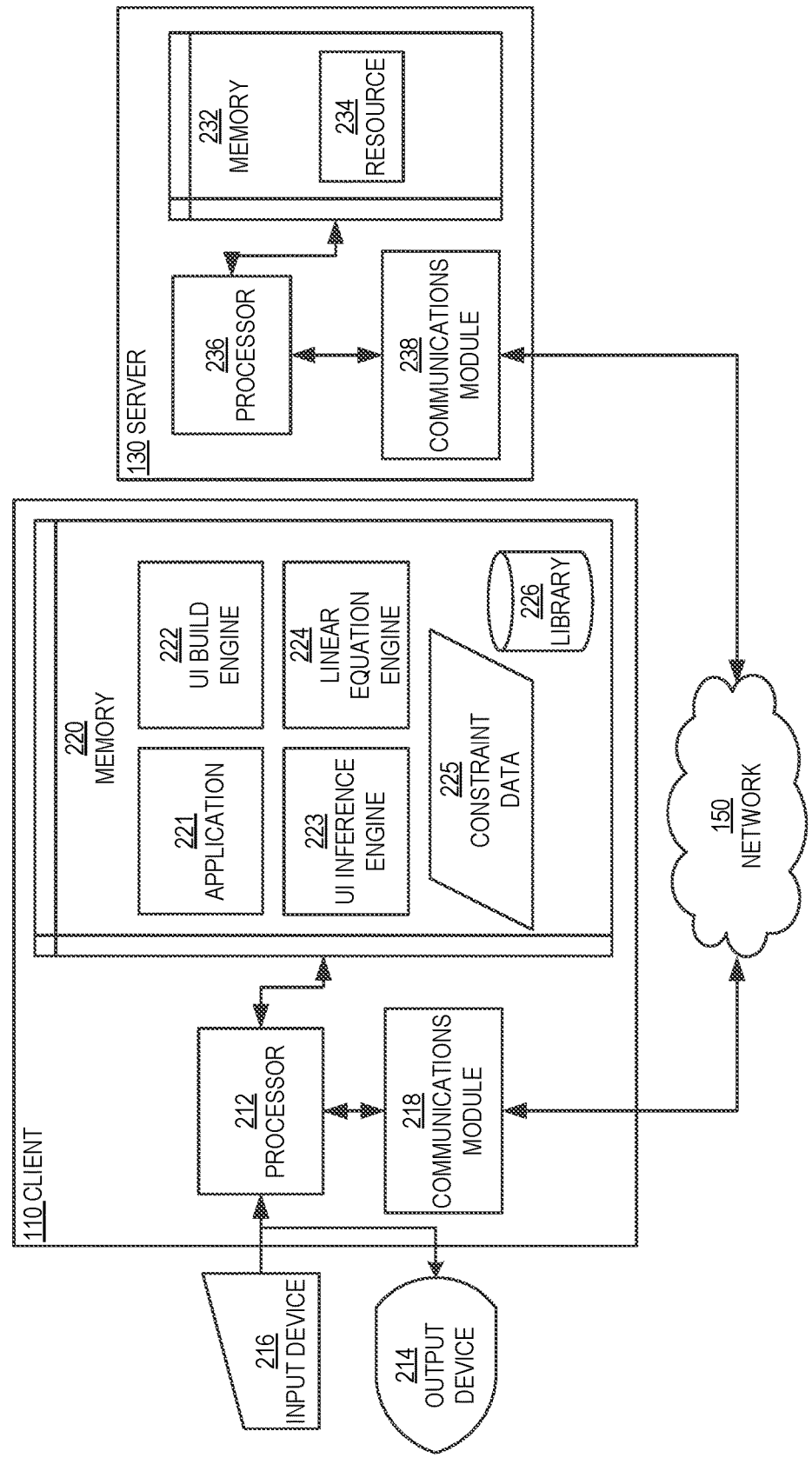
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The server 130 includes a processor 236, a communications module 238, and a memory 232. The memory 232 includes resource 234. The client 110 includes a processor 212, a communications module 218, and a memory 220. The client 110 and the server 130 are connected over the network 150 via the communications modules 218 and 238, respectively. The communications modules 218 and 238 are configured to interface with the network 150 to send and receive information, such as data, requests, responses, and commands to other devices on the network. The communications modules 218 and 238 can be, for example, modems or Ethernet cards.

The memory 220 of the client 110 includes application 221, UI build engine 222, UI inference engine 223 and linear equation engine 224. The memory 220 also includes constraint data 225 and library 226. One or more of application 221, UI build engine 222, UI inference engine 223 and linear equation engine 224 may be operated (e.g., using constraint data 225 and/or library 226) to provide a layout tool for a developer for visual layout of display objects of a user interface.

The processor 212 of the client 110 is configured to execute instructions, such as instructions physically coded into the processor 212, instructions received from software in memory 220, or a combination of both. For example, the processor 212 of the client 110 executes instructions to provide for display, on an output device 214, a layout tool for developing a user interface (UI) for an application. In some aspects, the layout tool includes a representation of a page. In some implementations, the page represents a web page or a landing page.

In certain aspects, the processor 212 of the client 110 is configured to receive a user input from a user via an editor interface of the application 221 (e.g., the layout tool). The user input indicates an instruction to position a first UI element on the page. The user input is received, for example, by the user accessing the application 221 in the memory 220 on the client 110 of the user, and the user submitting the user input using an input device 216 of the client 110. In another aspect, the processor 212 of the client 110 is configured to receive a second user input from the user via the layout tool. The second user input may indicate an instruction to position a second UI element on the page.

A user of the client 110 may use the input device 216 to submit a third user input indicating an instruction to create a connection from the second UI element to the first UI element via the layout tool. The layout tool may include an input section where the positioning of displayed widgets may be manipulated by the user. The input section may include a layout area and one or more controls to allow the user to connect widgets together as well as aligning widgets relative to one another within the layout area. For example, the first UI element may be a first widget and the second UI element may be a second widget, where the second widget is positioned relative to the first widget. In this example, the first widget may be connected to one side (or via one anchor) of the second widget, thus creating a spatial relationship between the first widget and the second widget. In this respect, the spatial relationship may indicate how the first widget is positioned relative to the second widget, and vice versa, on a page (or application interface layout) without the need of specifying a specific location (or coordinate) for each of the first widget and second widget.

In certain aspects, the processor 212, using the application 221 and the UI build engine 222, generates a layout constraint indicating a spatial relationship between the first UI element and the second UI element based on the connection. The layout constraint indicates that the first UI element and the second UI element are co-located at a same position on a page in some embodiments, or that the first UI element and the second UI element are spatially separated from one another by a defined margin. The margin may be in terms of density-independent pixels (dp or dip), scale-independent pixels (sp), pixels (px) or points (pt) depending on implementation. In some aspects, the processor 212, using the UI build engine 222 and the linear equation engine 224, provides the layout constraint in a layout data file associated with the UI. For example, the layout constraint may include a linear equation that represents the connection between the first UI element and the second UI element as a mathematical expression. In some aspects, the layout constraint is stored as the constraint data 225. In some implementations, the processor 212, using the application 221 and the library 226, provides the layout constraint to the linear equation engine 224 to resolve linear equations from the layout constraints in the constraint data 225. For example, the linear equation engine 224 may be configured to determine one or more errors in the connection between the first UI element and the second UI element, and minimizes the number of errors in the connection by resolving the linear equation. In some aspects, resolving the linear equation may include modifying the spatial relationship between the first UI element and the second UI element that minimizes the number of errors in the connection, and providing a new linear equation that represents the modified spatial relationship. The library 226 may be a data structure identifying how each of the layout constraints is defined.

As discussed above, the subject technology maps the two-dimensional placement of display objects, such as widgets, to linear equations without requiring manual input from end users, thus enhancing the end user experience in the development of UIs for applications. The subject technology also reduces the complexity of hierarchical arrangements found in traditional layout tools, where hierarchies are defined in relation to a parent container, by defining constraints based on the positioning of widgets relative to one another.

Figure 5:
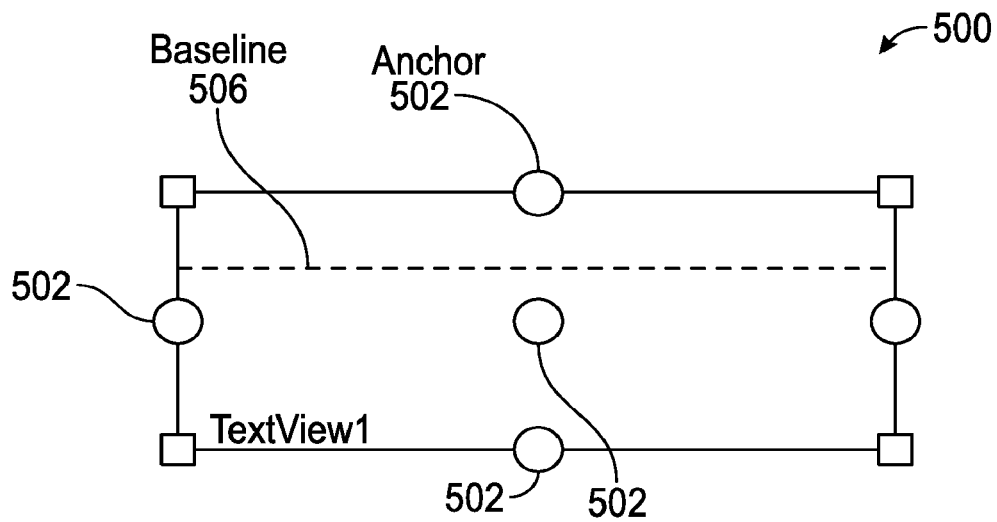

In some implementations, the constraints are defined by interconnections between widgets at anchor locations of the widgets (see FIG. 5). The layout constraints may include anchor margins that define a distance between spatially related widgets (see FIG. 6). The layout constraints may include an interconnection between at least two widgets through opposite-connected anchors, where the subject technology attempts to resolve the linear equation representing the opposite-connected anchors (see FIGS. 7A and 7B). In this respect, adjustments to the constraint may be needed to spread an amount of error detected in the connection between the anchor points of the widgets. In some implementations, the layout constraints include dimension-related constraints, where one or more dimensions of a widget are modified to facilitate the spread of the error found in the connection between the widgets (see FIGS. 9 and 10). The subject technology may automatically center a widget relative to other neighboring widgets (or hierarchically-related widgets) using centering constraints determined by a specific set of rules (see FIG. 9). In some implementations, the layout constraints include chain-related constraints, where widgets are connected as a chain indicating a series-based relationship among the widgets in the chain (see FIGS. 11A and 11B). In some implementations, the subject technology includes virtual containers and/or templates to help group display objects and guide the layout of display objects during the UI development process (see FIG. 12). In this respect, the virtual guidelines and/or templates are removed from display prior to a runtime process of the final layout. In one or more implementations, the virtual guidelines and/or templates are not included in the layout constraint and are not part of the UI layout hierarchy.

Figure 3:
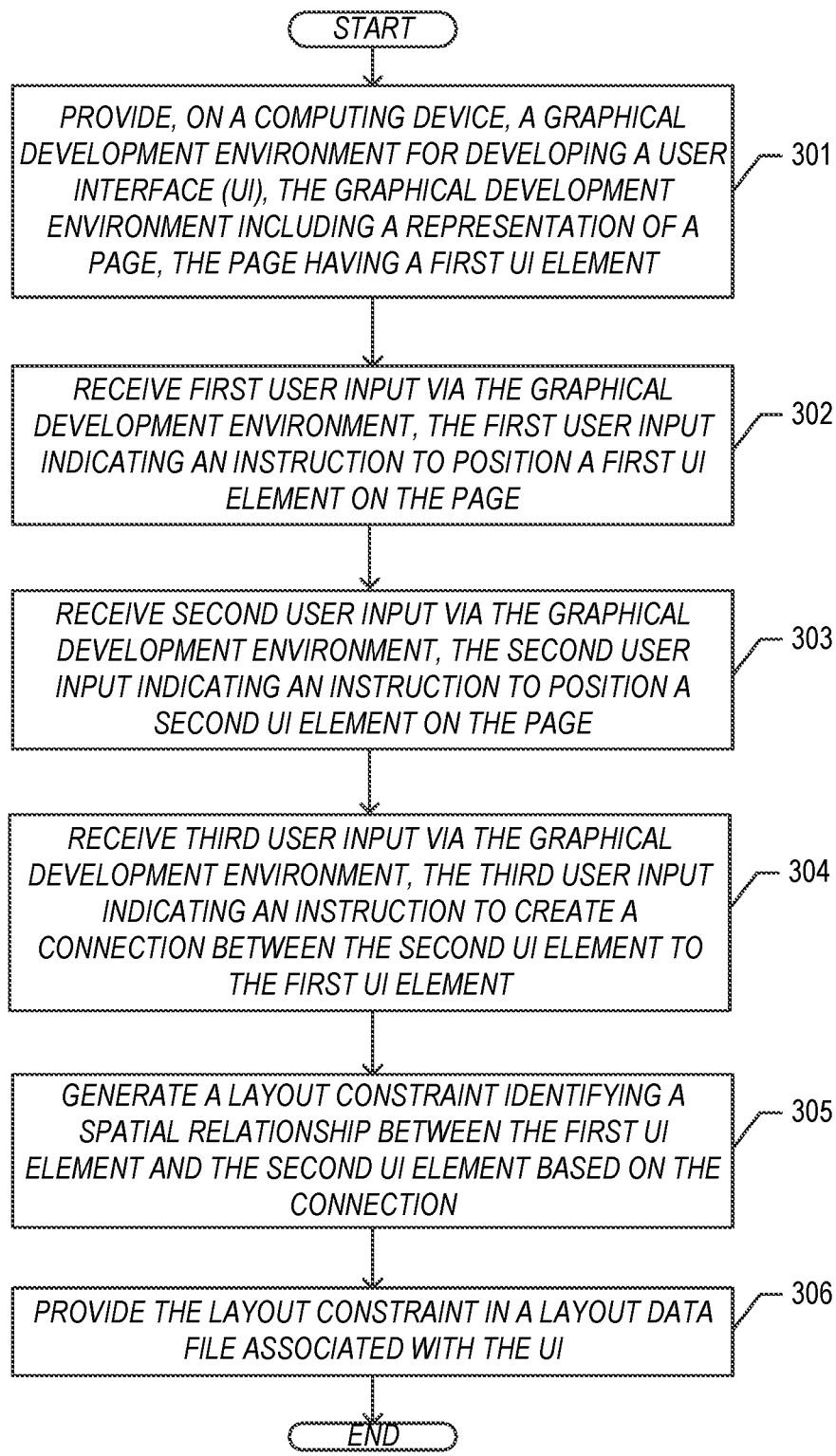
FIG. 3 illustrates an example process for building constraints-based layout systems using the example client of FIG. 2.

FIG. 3 illustrates an example process 300 for building constraints to identify layout relationships using the example client 110 of FIG. 2. While FIG. 3 is described with reference to FIG. 2, it may be noted that the process steps of FIG. 3 may be performed by other systems.

The process 300 begins by proceeding from beginning step 301. In step 301, a layout tool, provided for display on a computing device, may consist of a representation of a page, where the page also may include a first UI element placed on the page. The first UI element may be a first widget. The layout tool may sometimes be referred to as a graphical development environment or a layout application.

Subsequently, in step 302, the processor 236, using the UI build engine 222, receives a first user input indicating an instruction to position a first UI element on the page. In step 303, the processor 236, using the UI build engine 222, receives a second user input indicating an instruction to position a second UI element on the page. The second UI element may be a second widget. Next, in step 304, the processor 236, using the UI build engine 222, receives a third user input indicating an instruction to create a connection from the second UI element to the first UI element. In an aspect, the connection may be a connection from an anchor of the first UI element to an anchor of the second UI element. In another aspect, the connection may be created by a widget being grouped with other widgets in a virtual container (see FIG. 12).

In turn, in step 305, the processor 236, using the UI build engine 222, generates a layout constraint indicating a spatial relationship between the first UI element and the second UI element based on the connection. In this respect, the layout constraint represents a specific rule indicating how the second UI element is positioned relative to the first UI element on the page. In one or more implementations, the specific rule is generated by the UI build engine 222 as a linear equation that indicates the spatial relationship between the UI elements as a mathematical expression. The two-dimensional placement of the UI elements is mapped automatically to the linear equation without requiring user input that indicates the linear equation. Subsequently, in step 306, the processor 236, using the UI build engine 222, receives provides the layout constraint in a layout data file associated with the UI. In some implementations, the layout data file is in an extensible markup language (XML) file format.

The processor 236, using the UI build engine 222 and the linear equation engine 224, generates the layout constraint by mapping the connection to spatial positioning data and relationship data, the spatial positioning data indicating a location on the page with respect to the first UI element and the second UI element, determining coordinates on the page respectively for the first UI element and the second UI element based on the spatial positioning data and the relationship data, and providing for display the first UI element and the second UI element at the determined coordinates. The relationship data indicates a directional relationship between the first UI element and the second UI element with respect to one of the first UI element or the second UI element.

The processor 236, using the UI build engine 222, processes the spatial positioning data and the relationship data, and determine whether the relationship data and the spatial positioning data is ambiguous based on the processing. The relationship data and the spatial positioning data may be ambiguous when more than one potential set of coordinates can be calculated for at least one of the first UI element or the second UI element. For example, if the spatial positioning data and/or the relationship data indicate that at least one known dimension of a widget is known, then no linear equation solver may be required, thereby rendering the relationship data and the spatial positioning data as unambiguous. In this respect, the processor 236, using the UI build engine 222, resolves the relationship data and the spatial positioning data independent of a linear equation solver (e.g., the linear equation engine 224) to determine the coordinates when it is determined that the relationship data and the spatial positioning data are not ambiguous.

However, if no known variables satisfy a layout constraint, then the relationship data and the spatial positioning data may be transformed into linear equations. In this respect, the processor 236, using the UI build engine 222 and the linear equation engine 224, transforms the relationship data and the spatial positioning data into one or more linear equations when it is determined that the relationship data and the spatial positioning data are ambiguous, and resolves the one or more linear equations through the linear equation solver to determine the coordinates when the relationship data and the spatial positioning data are transformed into the one or more linear equations. In some aspects, the processor 236, using the UI build engine 222 and the linear equation engine 224, resolves the linear equation in the layout constraint. In one or more implementations, the processor 236, using the UI build engine 222, determines coordinates on the page respectively for the first UI element and the second UI element based on the resolved linear equation. In one or more implementations, the processor 236, using the UI build engine 222, provides for display the first UI element and the second UI element at the determined coordinates.

In one or more implementations, the processor 236, using the UI build engine 222, classifies the relationship data and the spatial positioning data into a particular class of constraints, and determines whether the particular class of constraints is associated with a first class of constraints or a second class of constraints different from the first class of constraints. For example, the first class of constraints includes constraints that do not require a linear equation solver to resolve the constraints, whereas the second class of constraints do require the linear equation solver. In this respect, the processor 236, using the UI build engine 222, resolves the relationship data and the spatial positioning data independent of a linear equation solver to determine the coordinates when it is determined that the particular class of constraints is associated with the first class of constraints. On the other hand, the processor 236, using the UI build engine 222, transforms the relationship data and the spatial positioning data into one or more linear equations when it is determined that the particular set of constraints is associated with the second class of constraints, and resolves the one or more linear equations through the linear equation solver to determine the coordinates when the relationship data and the spatial positioning data are transformed into the one or more linear equations.

The first UI element includes a first anchor and the second UI element includes a second anchor, in which the second anchor of the second UI element is connected to the first anchor of the first UI element based on the instruction to create a connection from the second UI element to the first UI element. The instruction to create the connection from the second UI element to the first UI element may indicate that the first anchor and the second anchor occupy a same target location on the page. The instruction to create the connection from the second UI element to the first UI element may indicate a defined distance between the first anchor and the second anchor.

The processor 236, using the UI build engine 222, receives a fourth user input indicating an instruction to position a third UI element on the page, and then receives a fifth user input via the layout application that indicates an instruction to create a first connection from the third UI element to the first UI element and a second connection from the third UI element to the second UI element. The processor 236, using the UI build engine 222, determines that the position of the third UI element with respect to the first UI element and the second UI element includes an error, in which an anchor on the first UI element (e.g., left-side anchor) and an anchor on the second UI element (e.g., right-side anchor) are restricted from being positioned on a same target location on the page as a result of the error. In one or more implementations, the error found in the layout constraint (e.g., defining the connection between the first and second UI elements) indicates that the two UI elements cannot be located on the same target location as relatively positioned (e.g., the first UI element is located to the left of the second UI element). The error may be found when the connection is established between two opposite-connected anchors of the UI elements (e.g., the left-side anchor of the first UI element connected to the right-side anchor of the second UI element).

The processor 236, using the UI build engine 222, spreads the error to the first connection between the third UI element and the first UI element and to the second connection between the third UI element and the second UI element. In this respect, the error spread onto both connections may be represented as a ratio of an amount of error spread to the first connection to an amount of error spread to the second connection. The processor 236, using the UI build engine 222, modifies the ratio of an amount of error on the first connection to an amount of error on the second connection, and adjust the amount of error on the first connection and the amount of error on the second connection based on the modified ratio. The processor 236, using the UI build engine 222, may modify the ratio based on user input and/or user preferences stored in the memory 220. In some aspects, the ratio is modified from a predetermined ratio value to a customized ratio value where the amount of error on each of the connections can be minimized. In one or more implementations, the processor 236, using the UI build engine 222, reduces the error to a predetermined value based on the modified ratio. The layout constraint indicates the amount of error spread to each of the respective connections. The processor 236, using the UI build engine 222, then determines the coordinates for the third UI element based on the adjusted amount of error on the first connection and the adjusted amount of error on the second connection.

In one or more implementations, the layout constraint includes a first margin associated with the first connection from the third UI element to the first UI element and a second margin associated with the second connection from the third UI element to the second UI element, in which the first margin indicates a distance between the first UI element and third UI element and the second margin indicates a distance between the second UI element and the third UI element.

The processor 236, using the UI build engine 222, provides for display a virtual object on the page. In one or more implementations, the virtual object is a visual guideline on the page. The visual guideline may serve as vertical and/or horizontal gridlines that assist a user in positioning widgets on the page. The visual guideline is triggered for display by user selection of a display control or automatically rendered upon initiating the layout tool. The processor 236, using the UI build engine 222, receives user input indicating an instruction to position either the first UI element or the second UI element relative to the virtual object. The processor 236, using the UI build engine 222, may render a final layout of the page based on the layout data file. The virtual object is removed from display on the page at runtime of the final layout. The virtual object is intended to assist developers during layout of the page and is not part of the final layout rendering (i.e., not included in the document object model (DOM) hierarchy).

Figure 4:
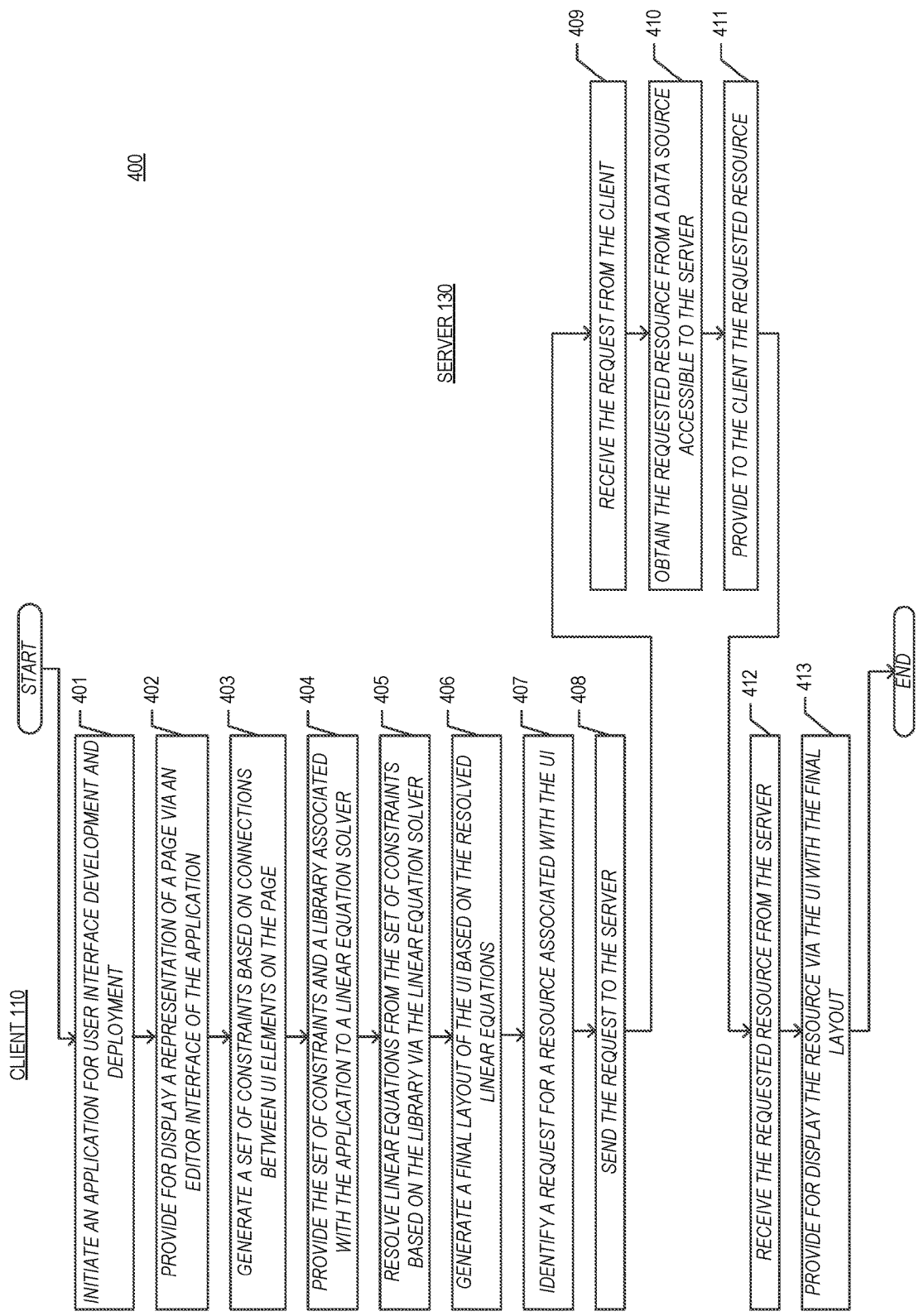
FIG. 4 illustrates an example process for user interface development and deployment using the example client and server of FIG. 2.

FIG. 4 illustrates an example process 400 for user interface development and deployment using the example client and server of FIG. 2. The process 400 begins in step 401 when a user, for example, loads an application 221 on a client 110 for user interface development and deployment.

Next, in step 402, the application 221 on the client 110 provides for display a representation of a page via an editor interface of the application 221. The representation of the page may include a layout are within which UI elements such as display objects can be placed, moved, arranged, and constrained relative to other display objects, guidelines or container features. In step 403, the client 110 generates, using the application 221 and the UI build engine 222, a set of constraints based on connections between UI elements on the page. For example, the set of constraints may include rules that define certain connections between the UI elements, such as indicating certain connections between the UI elements and/or certain spatial relationships between the UI elements (e.g., a first element is constrained to a location on the page that is to the right of a second element). In this respect, the UI build engine 222 facilitates the mapping of these connections to linear equations that represent respective layout constraints without the need of user input indicating or providing such linear equations. Subsequently, in step 404, the client 110 provides the set of constraints and a library associated with the application 221 to a linear equation solver (e.g. 224) in the client 110. The linear equation solver may process the constraints to spread any amount of error found in the constraints and generate modified constraints with the error minimized.

In step 405, the client 110 resolves linear equations from the set of constraints based on the library via the linear equation solver. Next, in step 406, the client 110 generates a final layout of the UI based on the resolved linear equations. In turn, in step 407, the client 110 identifies a request for a resource associated with the UI. In step 408, the client 110 sends the request to the server 130.

Turning to the server 130, in step 409, the server 130 receives the request for the resource from the client 110. Subsequently, in step 410, the server 130 obtains the requested resource from a data source accessible to the server 130. In step 411, the server 130 provides the requested resource to the client 110.

Turning to the client 110, in step 412, the client 110 receives the requested resource from the server 130. Next, in step 413, the client 110 provides for display the requested resource via the UI with the final layout. In this respect, the UI may be rendered with content (e.g., text, images, video) from the received resources to provide for display the widgets and associated content arranged in the final layout.

Constraint System Semantics

FIG. 5 illustrates a schematic diagram 500 of an example layout constraint semantic. Specifically, FIG. 5 provides a notion of "anchors" presented on the user interface elements (e.g., widgets). A "widget" has one anchor per side (left, top, right, bottom) as well as center (horizontal and vertical) anchors (e.g., 502), and a baseline anchor (e.g., 506).

The general insight of anchor connections is that a connection defines a first type of constraint, where the connection is established between an anchor from each widget. The anchor of a widget initiating the connection may be referred to as a "source anchor," whereas the anchor of a widget receiving the connection as the destination may be referred to as a "target anchor." The source anchor may be located at the same position as the target anchor in some embodiments, or the source anchor and target anchor may be located in different positions defined by a margin in other embodiments. The layout system of the present disclosure then gathers all the defined connections and attempts to minimize as much as possible the errors to generate the final layout. Widgets can then be defined completely relative to one another, rather than defined in relation to their parent container (as is often the case in traditional layout systems).

Anchor Margins

Figure 6A:
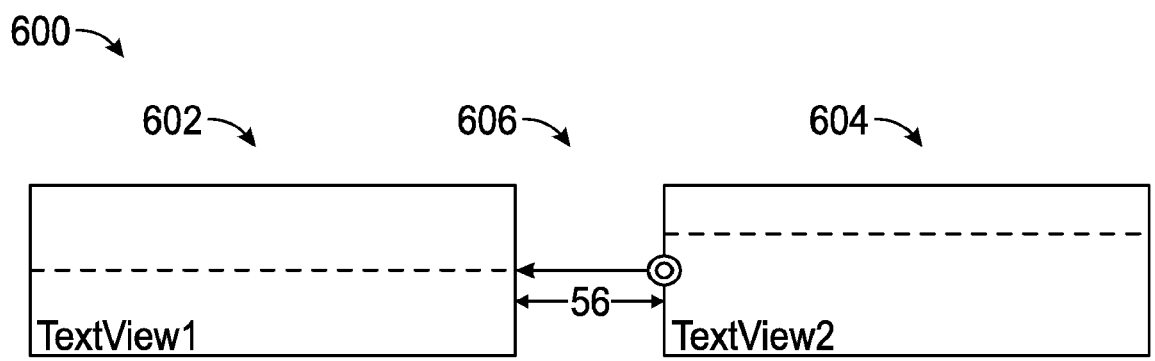
Figure 6B:
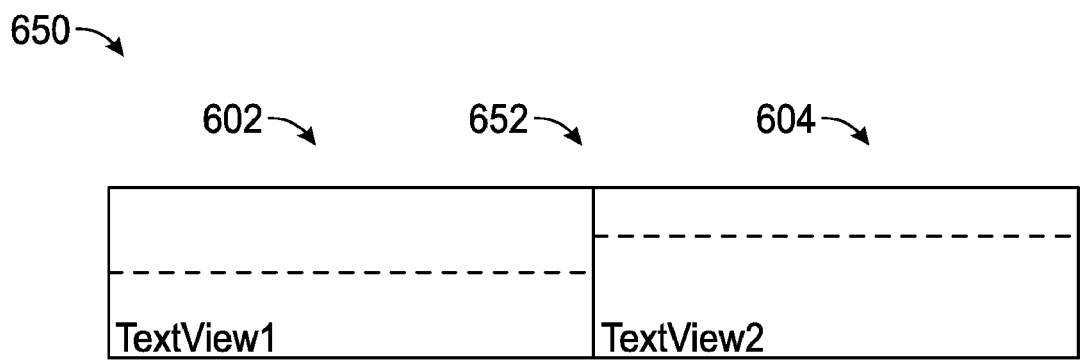

FIGS. 6A and 6B illustrate schematic diagrams 600 and 650 of example layout constraints identifying anchor margins. In FIG. 6A, the anchors (e.g., 502) can be connected together. For example, a layout, where a widget "TextView2" (e.g., 604) may be on the right of widget "TextView1" (e.g., 602), can be created by connecting the left anchor (e.g. 502) of TextView2 (e.g., 604) to TextView1's (e.g., 602) right anchor (e.g., 502). In FIG. 6B, when an anchor is connected to another anchor (e.g., the target anchor), it means that the two anchors may occupy the same location.

In some aspects, a margin can also be defined between the two anchor points on a connection. FIG. 6A shows a margin of 56 pixels (e.g., 606) between the left anchor of TextView2 (e.g., 604) and the right anchor of TextView1 (e.g., 602), while FIG. 6B shows the same relation with no margin defined (e.g., 652). The margin may be an arbitrary value depending on implementation. The constraints illustrated in FIGS. 6A and 6B may sometimes be referred to herein as single-sided constraints.

Opposite Connected Anchors

FIGS. 7A and 7B illustrate schematic diagrams 700 and 750 of example layout constraints identifying opposite connected anchors. When two opposite anchors (e.g., 708, 710) are connected, neither anchor can be positioned on their target. In essence, there is an inevitable "error" that the layout system has to accept (an error that the system tries to minimize).

In the particular case of opposite connected anchors (e.g., 708, 710) in FIG. 7A, the layout system of the present disclosure decides to "spread" the error equally on both connections, resulting in a centered widget (e.g., 706). In FIG. 7B, margins may be defined and be part of the layout constraints illustrated in FIG. 7A (e.g., 752, 754).

Figure 8A:
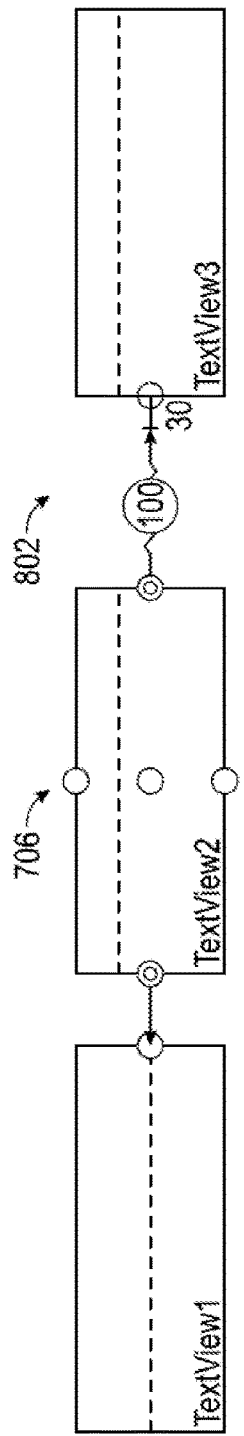
Figure 8B:
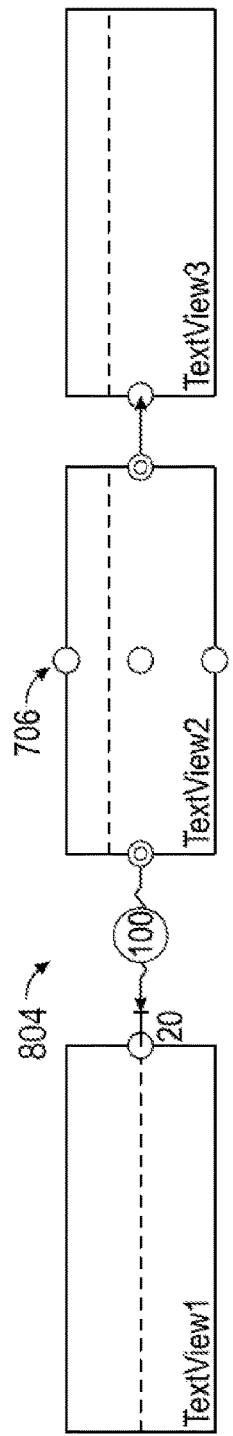
Figure 8C:
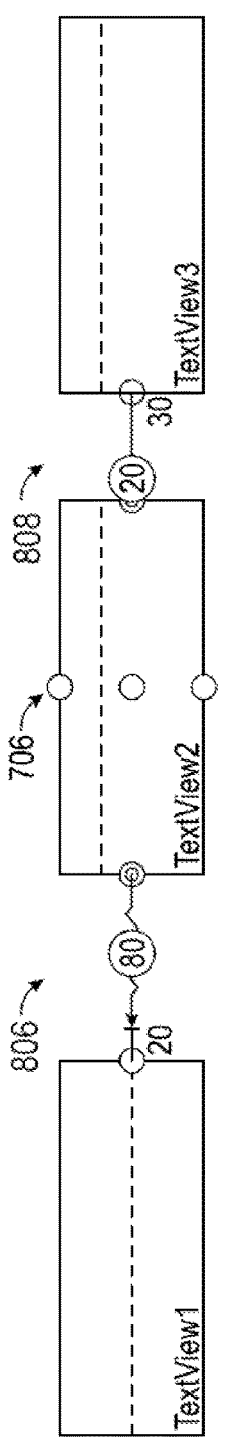

FIGS. 8A-8C illustrate schematic diagrams of example layout constraints identifying ratio spread of error. The layout system of the present disclosure can also be set up to decide how it will spread the error on the connections, as a ratio. The ratio spread of error can be redefined on a dual connection. In this respect, margins can still be active, as shown in FIGS. 8A-8C. For example, instead of 50% on each link, the layout system may decide to place 100% on either connection (e.g., 802, 804), or a different ratio such as 80%/20% (e.g., 806, 808). The ratios may vary depending on implementation. The constraints illustrated in FIGS. 7A-8C may sometimes be referred to herein as centering constraints.

Dimension Constraints

Figure 9:
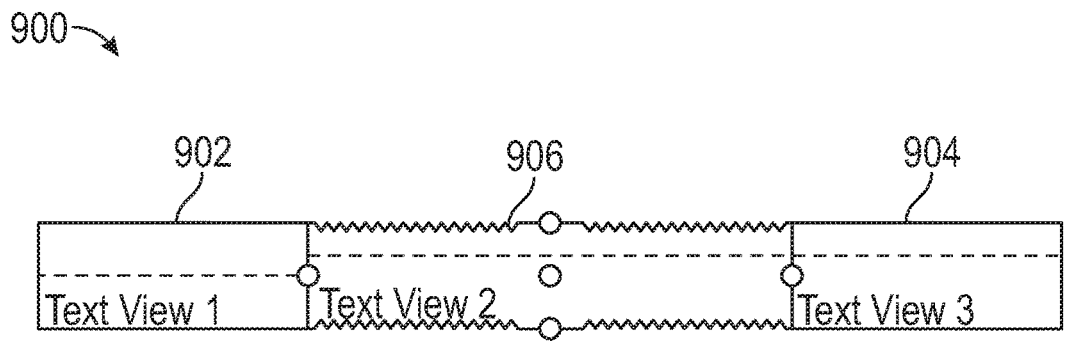

FIG. 9 illustrates a schematic diagram 900 of an example layout constraint identifying constrained dimensions. In addition to positioning, widget dimensions can also be constrained. The simplest way is to allow the widget to stretch to reduce the error from the defined constraints. In FIG. 9, the schematic diagram shows how the width of the widget stretch (e.g., 906) accommodates the left and right constraints (e.g., 902, 904).

In a similar way, the layout system of the present disclosure can define one dimension of the widget (width or height) in terms of another dimension, thus possibly applying a ratio (e.g., enforcing the fact that a given widget has to be a square, or that an image may be displayed in 16:9 ratio).

Figure 10:
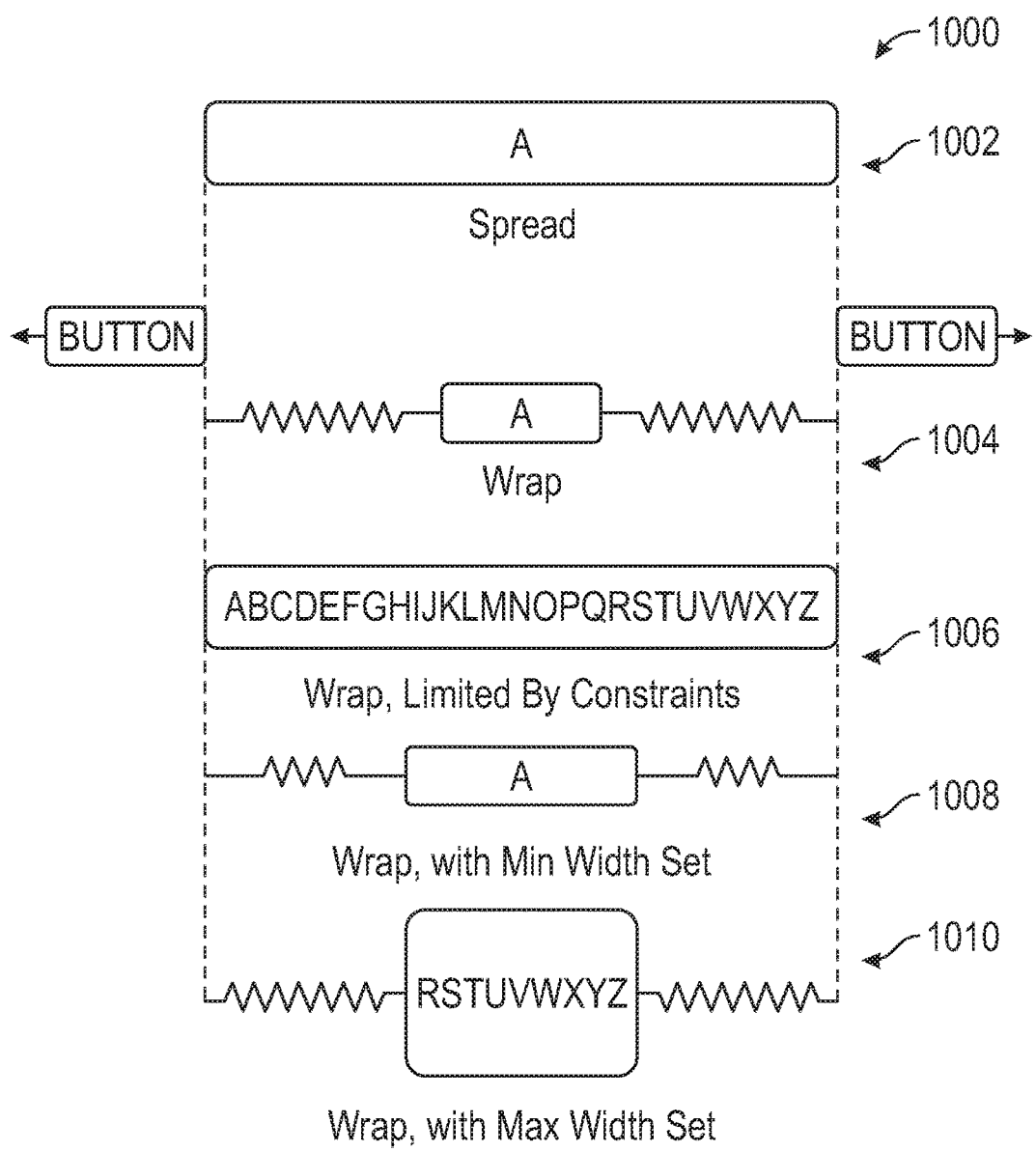
FIG. 10 illustrates a schematic diagram of an example of a dimension-related layout constraints.

FIG. 10 illustrates a schematic diagram 1000 of an example of a dimension-related layout constraints. In FIG. 10, the widget dimensions can be constrained by different classes of constraints. In a first class of dimension-related constraints, a widget may be constrained by a spread constraint 1002, where the length of the widget is spread between fixed virtual guidelines. In a second class of dimension-related constraints, a widget may be constrained by a wrap constraint 1004, where the length of the widget is wrapped between fixed virtual guidelines with respective defined distances in-between. In a third class of dimension-related constraints, a widget may be constrained by a wrap constraint 1006, where the wrapping is limited by the dimension constraints of the widget. In a fourth class of dimension-related constraints, a widget may be constrained by a wrap constraint 1008, where the wrapping is configured with the minimum width for the widget being set. In a fifth class of dimension-related constraints, a widget may be constrained by a wrap constraint 1010, where the wrapping is configured with the maximum width for the widget being set.

Figure 11A:
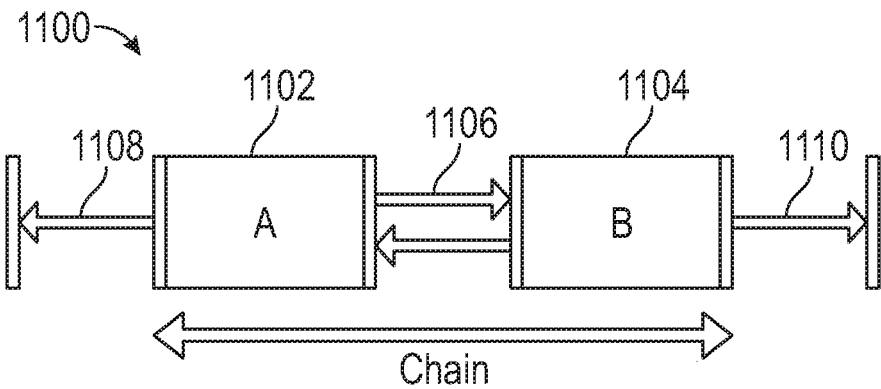
FIGS. 11A and 11B illustrate examples of chain-related layout constraints.
Figure 11B:
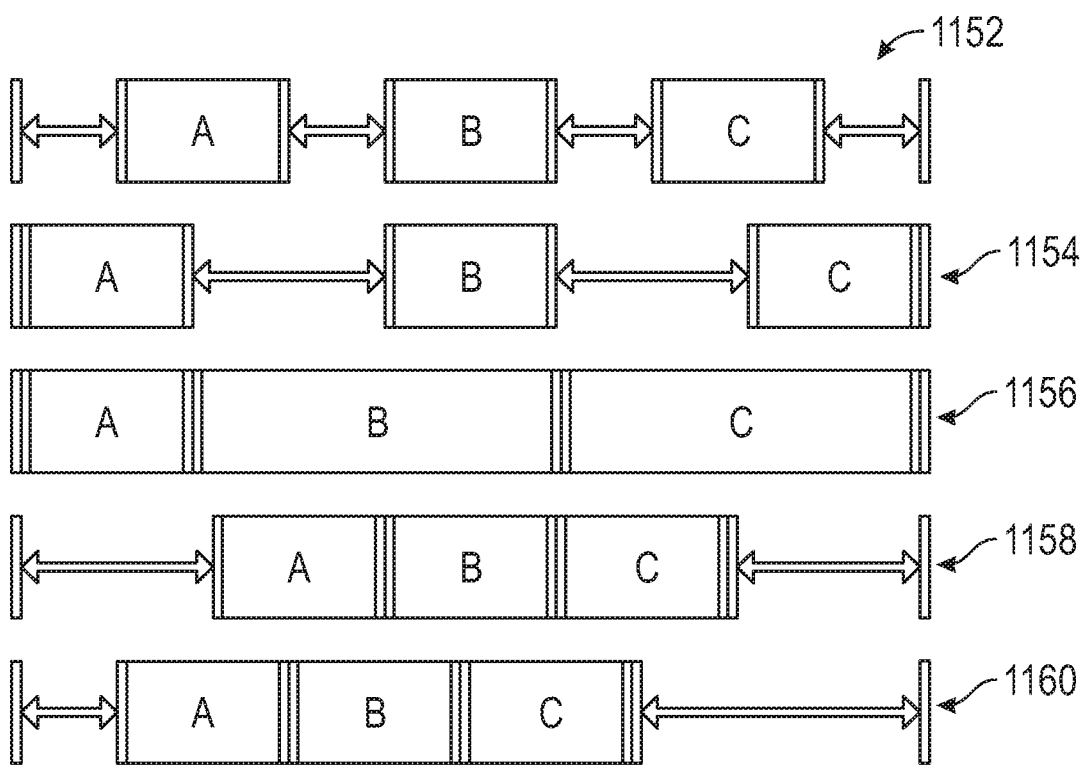

FIGS. 11A and 11B illustrate examples of chain-related layout constraints. In FIG. 11A, a layout constraint 1100 includes a chain-based relationship between widgets 1102 and 1104. The widgets 1102 and 1104 include defined distances 1108 and 1110, respectively, which are relative to side margins, respectively. The spatial relationship between the widgets 1102 and 1104 is bidirectional by connection 1106. In this respect, layout constraints may be applied to other widgets that are bounded to the chain.

In FIG. 11B, the positioning of widgets can be constrained by different classes of chain-based constraints. In a first class of chain-based constraints, the widgets may be constrained by a spread chain 1152, where each of the widgets along the chain is equally spaced apart within a fixed boundary including a fixed distance to side margins. In a second class of chain-based constraints, the widgets may be constrained by a spread chain 1154, where each of the end-located widgets along the chain are abutting the side margins and are equally spaced from the middle widget. In a third class of chain-based constraints, the widgets may be constrained by a weighted chain 1156, where certain widgets are weighted more heavily than other widgets along the chain to occupy the entire length between the side margins. In a fourth class of chain-based constraints, the widgets may be constrained by a packed chain 1158, where the widgets are packed together in series with equal distances on either end relative to the side margins. In a fifth class of chain-based constraints, the widgets may be constrained by a biased packed chain 1160, where the widgets are packed together in series with varying distances on either end relative to the side margins, respectively, depending on the amount of bias applied to either end.

Finding Centering Constraints

In some aspects, centering widgets in a layout based on a constraint system works by setting two opposite constraints of equal strengths. For example, if the constraint system has three widgets A, B, and C, aligned horizontally, and the objective is to have B centered between A and C, the constraint system may set up two constraints on B: (1) a left constraint to the right side of A, and (2) a right constraint to the left side of C. As the constraints will be of equal strength, the widget B will end up centered. Setting up those constraints one by one can be undesirably time-consuming when quickly prototyping a UI. More notable, requiring users to provide linear equations to express such constraints unnecessarily burdens the user experience in developing the UI, and poses a greater challenge in minimizing the amount of error that may be present in linear equations received from user input.

The layout system of the present disclosure automatizes the centering of a widget. The layout system can achieve this by finding the appropriate constraints as described in the problem (with traditional layout systems) and setting them up for the user. The algorithm applied in the layout system works as follows (explained for horizontal centering, vertical centering would work in a similar manner):

a. The layout system may maintain a best candidate to center to, for each side (left and right).

b. The layout system may initialize the best candidate to a parent widget's side: the left side of the parent for a left candidate, the right side of the parent for a right candidate.

c. The layout system may then gather a list of widgets that are siblings in the view hierarchy. Those are the widgets that can be centered on.

d. The layout system may iterate on the sibling's list, only looking at a specific side depending on the orientation of the centering and the direction of the search. For example, if the layout system intends to center a widget B horizontally, the layout system would perform two searches: one on the left side, and one on the right side. When searching on the left side, the layout system would only look at the right side of the widgets the layout system checks, and similarly when searching on the right side, the layout system would only look at the left side of the widgets.

e. For each widget's side the layout system evaluates, the layout system may do two steps: 1. if the side actually intersects with another side. For example, for horizontal centering, the layout system may check that both sides intersect in the vertical axis. 2. The layout system may maintain the best candidate to connect to. A better candidate is one whose distance to the other side is smaller than the current candidate.

f. The process is repeated on the opposite side of the widget. This method allows the layout system to easily generate the constraints, thereby allowing the layout system to center widgets, thus avoiding overlapping of widgets (an undesirable result).

Virtual Containers

Figure 12:
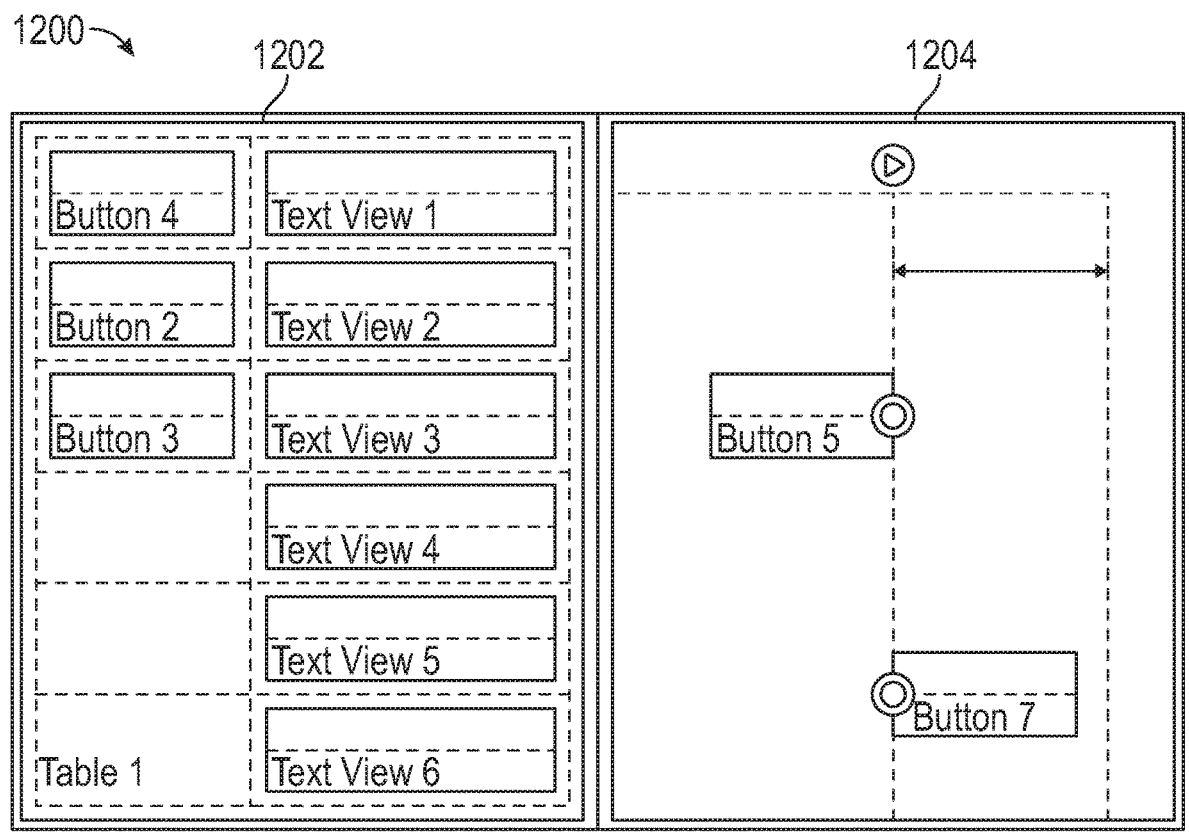
FIG. 12 illustrates an example of a virtual object for setting a layout constraint.

FIG. 12 illustrates a schematic diagram 1200 of an example layout constraint identifying virtual containers. The present disclosure provides a layout system of constraints intended to easily represent arbitrary one-to-one relationships between widgets. A common issue is that sometimes a given layout is expressed much more simply in terms of groups rather than by considering the individual widgets. For example, a user (e.g., developer) may want to center vertically a group of widgets.

Most traditional layout systems (and/or engines) address this need by introducing specific containers that layout the widgets they contain in a given way. In FIG. 12, the layout system of the present disclosure instead introduces virtual containers (e.g., 1202) that represent a group of widgets. Constraints can then be set on the group itself rather than its widgets. Importantly, such virtual containers do not lay out their children, instead layout computation is kept in the parent constraint system. The virtual containers give developers and UI designers a much more flexible way of expressing their UI design, thus allowing them to provide hierarchies of widgets and subdivide the container in separate components. As the virtual containers themselves do not require any computation, the layout system keeps the performance advantages of a central place where the layout system can do the full layout computation. This also results in much shallower layout hierarchies, further enhancing performance by the layout system. In traditional layout systems, layout containers are part of the view hierarchy and need to be traversed at paint time, thereby adversely impacting performance.

The layout system of the present disclosure allows the virtual containers (e.g., 1202) to express specific layout strategies. This brings the layout system to a much higher level, as hierarchies allow a much more powerful way of expressing layouts. Contrary to traditional layout systems, the virtual containers only have to exist when the constraints are being set up; they do not need to be in the final view hierarchy, which has performance advantages. For example, less traversal through hierarchies is needed when painting the screen, and in certain aspects all of the constraints can be gathered in one place. This allows the layout system of the present disclosure to completely split the notion of view hierarchies (determining which widgets to display) and the notion of how to position the widgets. This in turn provides the layout system more flexibility on how the layout system can change the way the layout system can position the widgets at runtime, animate them, etc. In this respect, the virtual containers do not become part of the final layout and/or DOM of the page.

In FIG. 12, the virtual containers (e.g., 1202) can also provide additional help when creating the layout visually, such as (1) providing for display virtual visual guidelines (e.g., 1204) that can be used to help create a layout, (2) table, templates, or other higher-level structure can be made available to users, and (3) the virtual helper tools can be confined to the design tool.

Virtual Templates

A group of widgets may need to be positioned in a well-defined manner, such as aligning all the widgets one after another, or organizing a group of widgets as a table, or providing specific full-screen layouts following a given specification. In traditional layout systems, separate layout components are in charge of this.

In some aspects, virtual templates are defined that decide how to position their children widgets. One distinction between the layout system of the present disclosure and the traditional layout systems is that the virtual templates do not do the layout computation themselves; rather, they simply express how their children are constrained with one another, using a common system of conceptual constraints defined in the layout system. The constraints set on the children are passed to the root constraint system container, which will do the actual computation. This provides the layout system of the present disclosure with several advantages: (1) keeps all computation in a single place, which has performance and flexibility benefits; (2) as such virtual templates directly use the vocabulary of constraints defined in the layout system, they are often simpler to create than a manually programmed one; (3) external developers have the same access than platform developers to develop those custom templates, giving them the same benefit to quickly create their own custom templates. The ease of creation of the virtual templates via the layout system of the present disclosure may help developers to more easily create custom layouts. Finally, this also significantly reduces the need for deep layers of hierarchies in a UI, as it conceptually detaches the layout itself from the view system, which brings a set of separate performance and flexibility advantages. In this respect, the virtual templates do not become part of the final layout and/or DOM of the page.

Virtual Helper Objects

User interfaces may sometimes be described by developers (e.g., users of the layout system) using elements that do not exist in the actual view system. For example, guidelines are typically used to express dimensions/positions.

The layout system of the present disclosure defines virtual helper objects that can be used to set up constraints on widgets at creation time, but that can be safely discarded during painting/layout time. Those objects only have to exist at conception time, once a constraint system is created (using them), they can be removed. One canonical example are virtual guidelines (e.g., 1204 of FIG. 12), which allow users to position widgets in relation to horizontal and vertical guidelines. These virtual guidelines have their own position set relative to their parent (relative to a given side of their parent, or to a percentage-based position). When the user loads a given constraint system that uses the guidelines, the guidelines allow the user to correctly generate the right linear equation in the layout system. But at layout/painting time, such virtual helpers do not need to be part of the view hierarchies. In other words, the virtual helper objects do not become part of the final layout and/or DOM of the page. Other such helper objects, that do not need to be part of the final view hierarchy, can be created to allow users to more simply express a layout.

Rendering Background of Virtual Components

In a typical view hierarchy representing a user interface, various elements are present: (1) widgets necessary for the interaction (showing info or allowing an action), (2) intermediate layout components, in charge of the positioning of the widgets, (3) various decorative extra widgets that are only present to draw decoration, such as background content, etc. This results in view hierarchies that are more complex and deeper in the number of hierarchical layers than is necessary purely from a functional perspective, and thus less performant. Specifically, as those "decorative" widgets are only used as decoration and are not functional, it is not theoretically efficient to have to use widgets, a complex object, for this task alone.

As discussed above, the layout system of the present disclosure is based on constraints represented as a system of linear equations. In the layout system of the present disclosure, virtual containers are provided (e.g., 1202 of FIG. 12), which largely remove the need for intermediate layout components other than a top layout component (where the full constraint system positioning all the widgets is resolved). Key to addressing the problem of the need for decorative widgets in the hierarchy is the concept of taking advantage of this existence of virtual containers, thereby allowing users of the layout system to specify for example a background drawable (color or image) on a virtual container. While those virtual containers will not be part of the view hierarchy as far as the painting of the view hierarchy is concerned, they are still accessible to users. The top-level layout component, which contains all the widgets and virtual containers, has on the other hand the opportunity to paint first. By keeping track of the drawable specified in the virtual containers, this top-level layout component can do a single draw pass before traversing the widgets it contains and drawing them. That single draw pass will be in charge of drawing all the drawables defined in virtual containers. This approach allows users to create visually identical UI, but with a much more efficient way of drawing a list of such content, as well as helping reduce the view hierarchy complexity.

Custom Widgets and Templates

Creating custom widgets is typically a complex undertaking for users of traditional layout systems. Often, they are only interested in creating "compound" widgets, such as a custom widget that is defined purely using other existing widgets. A common problem in these traditional layout systems when customizing widgets is performance and flexibility of the system. In the layout system of the present disclosure, such compound object can be defined with virtually no performance loss.

Collapsing of Embedded Constraint Systems

Some traditional layout systems work by having a hierarchy of layout managers containing the widgets to layout as children. A layout manager can also be a child of another layout manager. This approach often results in deep view hierarchies, particularly when having to lay out complex UIs and/or using nested simpler layout managers. The issue with deep hierarchies is that the hierarchy is not optimal in terms of performance. For example, every time a layout is needed, the hierarchy needs to be traversed.

In some aspects, the layout system of the present disclosure centralizes all constraints in a single place to be resolved by the linear equation engine solver (e.g., 224). The traditional layout systems support virtual layout managers that add their constraints to the top-parent constraint system. In a similar way, the layout system of the present disclosure automatically embeds other full constraint layout manager instances that are descendant of a parent layout manager, thus moving the resolution into the root constraint manager. The advantage of doing this is a reduction in resources used and a centralization of the solving process, thus allowing better performance from the layout system. In this respect, the insertion of new layout managers may be inexpensive, particularly if they are immediate descendants. This also results in practice in a flattening of hierarchies in the view system that also helps with performance without sacrificing expressiveness brought by the layout hierarchies.

Insertion and/or Removal of Constrained UI Elements

Layout of widgets in a running application often needs the ability for dynamic changes in the hierarchy, such as adding, removing, or hiding a widget. In a generic constraint-based layout, such changes need to be dealt correctly and efficiently. In a constraint-based generic layout engine, removal and hiding of a widget are critical.

In some aspects, the removal process in relation to the layout system of the present disclosure is two-pronged: (1) the layout system would need to consider differently removal of constraints on a widget, and (2) removal of the widget itself. The layout system of the present disclosure utilizes two intrinsic constraints on a widget to specify its fixed position. When breaking up constraints on a widget, the layout system can compute the current (pre-breakage) position of that widget, and store it in the intrinsic constraints, then safely remove the constraints, with the widget staying in the same position as before, thereby allowing for an easy workflow for users of the layout system. The second part of this problem involves the removal of the widget itself. The issue here is not the constraints set on that widget (which are removed with the widget), but rather constraints that are set on other widgets in the layout, which point to the widget about to be removed. The layout system of the present disclosure would need to iterate on those widgets, and remove the associated constraints, following similar rules as step #1 on constraint removals.

Figure 13A:
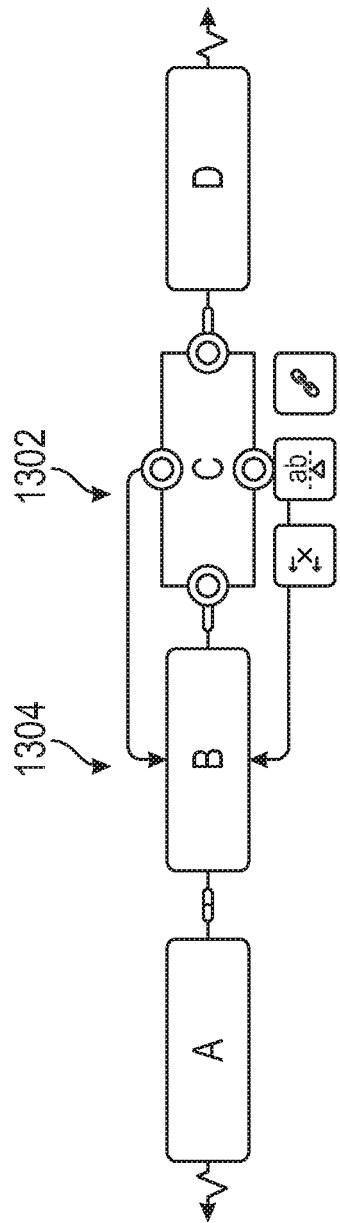
FIGS. 13A and 13B illustrates an example of a layout constraint indicating an object that disappears at runtime.
Figure 13B:
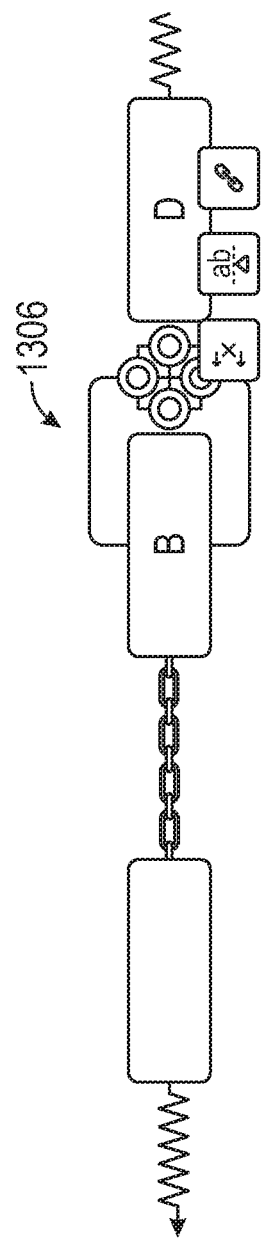

FIGS. 13A and 13B illustrates an example of a layout constraint indicating an object that disappears at runtime. In one or more implementations, the last behavior that needs to be specified by the layout system is what happens when a widget is marked as gone—i.e., it is still present, but may not be impacting the layout (e.g., invisible). In this regard, the layout system of the present disclosure keeps the widget in the solver pass, but sets its size to zero. Another approach is to do an optimization pass, where the layout system would follow the constraints set on the widget marked as gone and use the constraints set on it to replace the constraints another widget has on the gone widget. For example, in FIG. 13A, a widget A's (e.g., 1304) right side pointing to a widget B's (e.g., 1302) left side is provided, where widget B's (e.g., 1302) position is constrained by some other present constraints. If widget B (e.g., 1302) is marked as gone, the layout system can set widget B's dimension to zero (e.g., 1306 in FIG. 13B), and everything will work correctly; or, the layout system can evaluate the constraints setting the position of widget B's left side, and replace widget A's constraint using the evaluated constraints.

Figure 14:
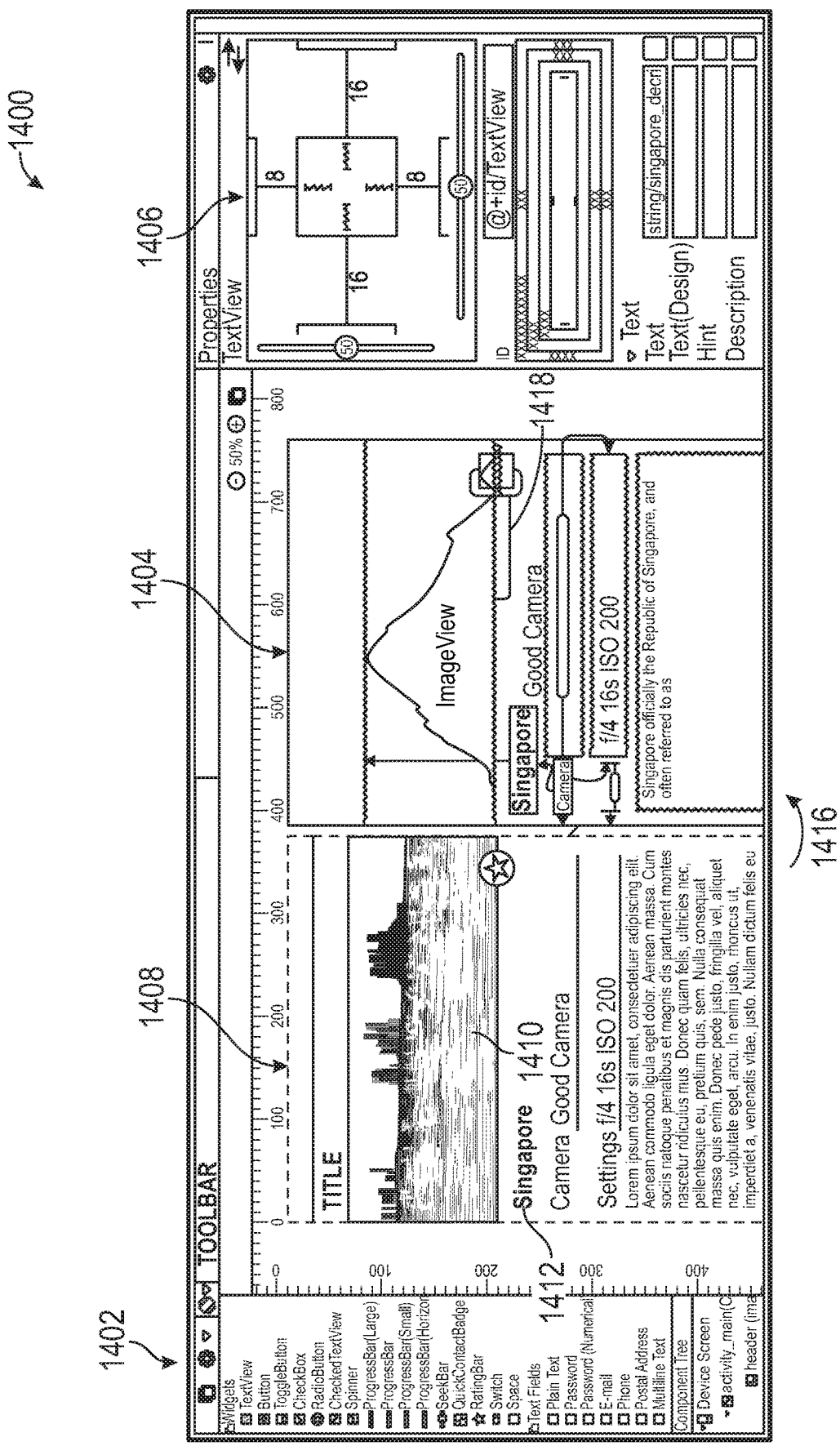
FIG. 14 illustrates an example of an editor interface of an application for developing and deploying user interfaces.

FIG. 14 illustrates an example of an editor interface 1400 of an application 221 for developing and deploying user interfaces. The editor interface 1400 includes a widget palette 1402, a layout editor window 1404, a layout inspector window 1406 and a user interface 1408. The widget palette 1402 may include a listing of widget options for positioning within the layout editor window 1404. The layout editor window 1404 provides a canvas where a user may manipulate one or more positions of a widget including adding and/or removing connections between the positioned widgets. Some of these connections may include making connections between the placed widgets via the anchors of the respective widgets. The layout inspector window 1406 provides an interface to obtain additional information relating to a widget selected within the layout editor window 1404. The additional information may include a description for the widget, a text title for the widget, an identifier for the widget, or specific dimensions for the widget. The user interface 1408 provides for display a run-time representation of the user interface layout based on the layout constraints defined within the layout editor window 1404.

In the example of FIG. 14, the user interface 1408 with various display objects such as an image 1410 and a text view 1412, may be analyzed (e.g., by UI inference engine 223) to determine constraints between the various display objects therein. As indicated by arrow 1416, the layout editor window 1404 may then be provided to a developer (e.g., using UI build engine 222) that includes various constraints 1418 determined for the existing user interface (e.g., 1408). User interface code for the user interface 1408 that now includes the determined constraints may also be generated. In this way, new or updated code for the user interface 1408 may be generated with improved functionality (e.g., due to a shallower hierarchy) and additional modifications and complexity can be added to the user interface 1408 by adding to, reducing, or otherwise modifying the determined constraints.

Hardware Overview

Figure 15:
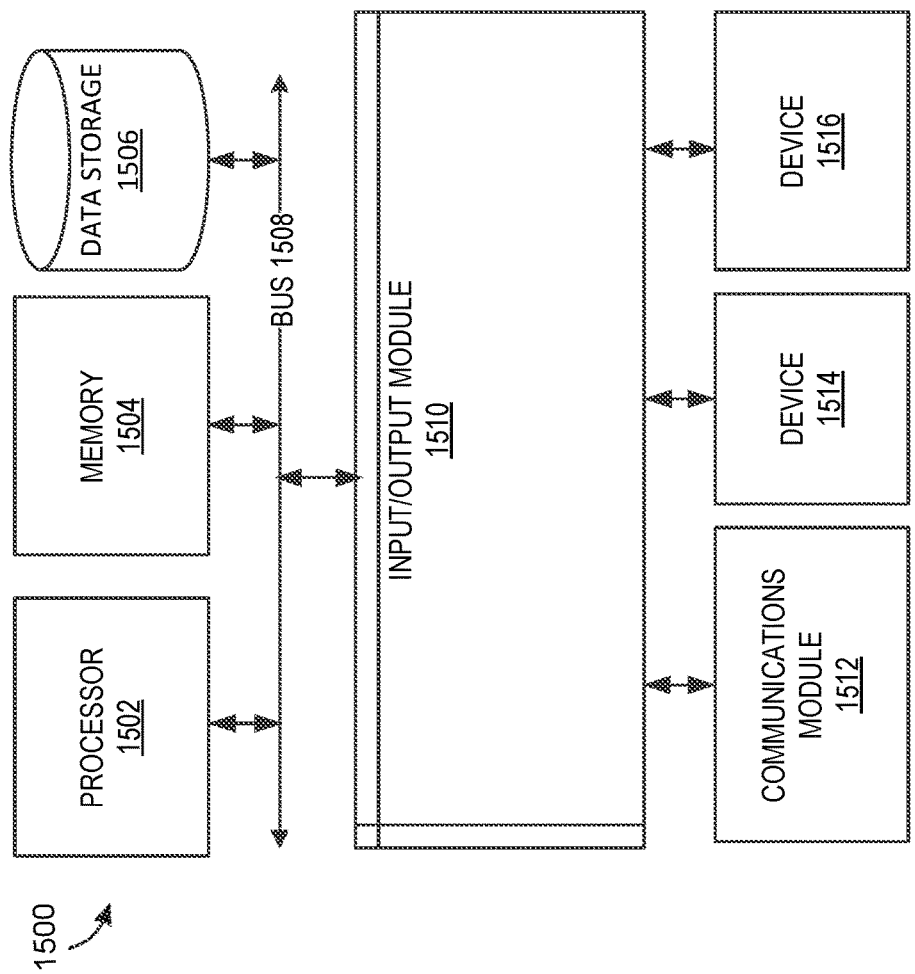
FIG. 15 is a block diagram illustrating an example computer system with which the client and server of FIG. 2 can be implemented.

FIG. 15 is a block diagram illustrating an exemplary computer system 1500 with which the client 110 and server 130 of FIG. 1 can be implemented. In certain aspects, the computer system 1500 may be implemented using hardware or a combination of software and hardware, either in a dedicated server, or integrated into another entity, or distributed across multiple entities.

Computer system 1500 (e.g., client 110 and server 130) includes a bus 1508 or other communication mechanism for communicating information, and a processor 1502 (e.g., processor 212 and 236) coupled with bus 1508 for processing information. By way of example, the computer system 1500 may be implemented with one or more processors 1502. Processor 1502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1500 can include, in addition to hardware, code that creates an execution environment for the computer program in question, e.g., code that constitutes processor firmware, a protocol stack, a database management system, an operating system, or a combination of one or more of them stored in an included memory 1504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1508 for storing information and instructions to be executed by processor 1502. The processor 1502 and the memory 1504 can be supplemented by, or incorporated in, special purpose logic circuitry.

The instructions may be stored in the memory 1504 and implemented in one or more computer program products, i.e., one or more modules of computer program instructions encoded on a computer readable medium for execution by, or to control the operation of, the computer system 1500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1504 may also be used for storing temporary variable or other intermediate information during execution of instructions to be executed by processor 1502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1500 further includes a data storage device 1506 such as a magnetic disk or optical disk, coupled to bus 1508 for storing information and instructions. Computer system 1500 may be coupled via input/output module 1510 to various devices. The input/output module 1510 can be any input/output module. Exemplary input/output modules 1510 include data ports such as USB ports. The input/output module 1510 is configured to connect to a communications module 1512. Exemplary communications modules 1512 (e.g., communications modules 218 and 238) include networking interface cards, such as Ethernet cards and modems. In certain aspects, the input/output module 1510 is configured to connect to a plurality of devices, such as an input device 1514 (e.g., input device 216) and/or an output device 1516 (e.g., output device 214). Exemplary input devices 1514 include a keyboard and a pointing device, e.g., a mouse or a trackball, by which a user can provide input to the computer system 1500. Other kinds of input devices 1514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1516 include display devices, such as a LCD (liquid crystal display) monitor, for displaying information to the user.

According to one aspect of the present disclosure, the client 110 and server 130 can be implemented using a computer system 1500 in response to processor 1502 executing one or more sequences of one or more instructions contained in memory 1504. Such instructions may be read into memory 1504 from another machine-readable medium, such as data storage device 1506. Execution of the sequences of instructions contained in main memory 1504 causes processor 1502 to perform the process steps described herein. One or more processors in a multi-processing arrangement may also be employed to execute the sequences of instructions contained in memory 1504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1500 can include clients and servers. A client and server are generally remote from each other and typically interact through a communication network. The relationship of client and server arises by virtue of computer programs running on the respective computers and having a client-server relationship to each other. Computer system 1500 can be, for example, and without limitation, a desktop computer, laptop computer, or tablet computer. Computer system 1500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1502 for execution. Such a medium may take many forms, including, but not limited to, non-volatile media, volatile media, and transmission media. Non-volatile media include, for example, optical or magnetic disks, such as data storage device 1506. Volatile media include dynamic memory, such as memory 1504. Transmission media include coaxial cables, copper wire, and fiber optics, including the wires that comprise bus 1508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Various examples of aspects of the disclosure are described below. These are provided as examples, and do not limit the subject technology.

According to an aspect of the present disclosure, a computer-implemented method is provided. The method includes providing, on a computing device, a layout application for developing a user interface (UI), in which the layout application includes a representation of a page. The method includes receiving first user input via the layout application, in which the first user input indicates an instruction to position a first UI element on the page. The method includes receiving second user input via the layout application, in which the second user input indicates an instruction to position a second UI element on the page. The method includes receiving third user input via the layout application, in which the third user input indicates an instruction to create a connection from the second UI element to the first UI element. The method includes generating a layout constraint indicating a spatial relationship between the first UI element and the second UI element based on the connection. The method also includes providing the layout constraint in a layout data file associated with the UI.

In generating the layout constraint, the method also includes mapping the connection to spatial positioning data and relationship data. In one or more aspects, the spatial positioning data indicates a location on the page with respect to the first UI element and the second UI element. In one or more aspects, the relationship data indicates a directional relationship between the first UI element and the second UI element with respect to one of the first UI element or the second UI element. The method also includes determining coordinates on the page respectively for the first UI element and the second UI element based on the spatial positioning data and the relationship data. The method also includes providing for display the first UI element and the second UI element at the determined coordinates.

In determining the coordinates, the method also includes processing the spatial positioning data and the relationship data. The method also includes determining whether the relationship data and the spatial positioning data are ambiguous based on the processing. In one or more aspects, the relationship data and the spatial positioning data are ambiguous when more than one potential set of coordinates can be calculated for at least one of the first UI element or the second UI element. The method also includes resolving the relationship data and the spatial positioning data independent of a linear equation solver to determine the coordinates when it is determined that the relationship data and the spatial positioning data are not ambiguous. The method also includes transforming the relationship data and the spatial positioning data into one or more linear equations when it is determined that the relationship data and the spatial positioning data are ambiguous. The method also includes resolving the one or more linear equations through the linear equation solver to determine the coordinates when the relationship data and the spatial positioning data are transformed into the one or more linear equations.

In determining the coordinates, the method also includes processing the spatial positioning data and the relationship data. The method also includes classifying the relationship data and the spatial positioning data into a particular class of constraints. The method also includes determining whether the particular class of constraints is associated with a first class of constraints or a second class of constraints different from the first class of constraints. The method also includes resolving the relationship data and the spatial positioning data independent of a linear equation solver to determine the coordinates when it is determined that the particular class of constraints is associated with the first class of constraints. The method also includes transforming the relationship data and the spatial positioning data into one or more linear equations when it is determined that the particular class of constraints is associated with the second class of constraints. The method also includes resolving the one or more linear equations through the linear equation solver to determine the coordinates when the relationship data and the spatial positioning data are transformed into the one or more linear equations.

In one or more aspects, the first UI element includes a first anchor and the second UI element includes a second anchor. The second anchor of the second UI element may be connected to the first anchor of the first UI element based on the instruction to create the connection from the second UI element to the first UI element.

In one or more aspects, the instruction to create the connection from the second UI element to the first UI element indicates that the first anchor and the second anchor occupy a same target location on the page.

In one or more aspects, the instruction to create the connection from the second UI element to the first UI element indicates a defined distance between the first anchor and the second anchor.

In generating the layout constraint, the method also includes determining that the connection includes an error. In one or more aspects, the error indicates that the first anchor and the second anchor are restricted from being positioned on a target location on the page. The method also includes modifying one or more dimensions of at least one of the first UI element or the second UI element. The method also includes reducing an amount of the error to a predetermined value based on the modified one or more dimensions.

The method also includes receiving a fourth user input indicating an instruction to position a third UI element on the page. The method also includes receiving a fifth user input indicating an instruction to create a first connection from the third UI element to the first UI element and a second connection from the third UI element to the second UI element. The method also includes determining that the position of the third UI element with respect to the first UI element and the second UI element includes an error. The method also includes modifying a ratio of an amount of error on the first connection to an amount of error on the second connection. The method also includes adjusting the amount of error on the first connection and the amount of error on the second connection based on the modified ratio. The method also includes determining coordinates for the third UI element based on the adjusted amount of error on the first connection and the adjusted amount of error on the second connection.

In one or more aspects, the layout constraint includes a first margin associated with the first connection from the third UI element to the first UI element and a second margin associated with the second connection from the third UI element to the second UI element. In one or more aspects, the first margin indicates a distance between the first UI element and third UI element and the second margin indicating a distance between the second UI element and the third UI element.

The method also includes providing for display a virtual object on the page, the virtual object being a visual guideline on the page. The method also includes receiving user input indicating an instruction to position one or more of the first UI element or the second UI element relative to the virtual object, the spatial relationship between the first UI element and the second UI element being based on the virtual object. The method also includes rendering a final layout of the page based on the layout data file. In one or more aspects, the virtual object is removed from display on the page at runtime of the final layout.

According to an aspect of the present disclosure, a system is provided including one or more processors and a computer-readable storage medium coupled to the one or more processors, the computer-readable storage medium including instructions. The instructions cause the one or more processors to provide, on a computing device, a layout application for developing a UI, in which the layout application includes a representation of a page. The instructions also cause the one or more processors to receive first user input via the layout application, in which the first user input indicates an instruction to position a first UI element on the page. The instructions also cause the one or more processors to receive second user input via the layout application, in which the second user input indicates an instruction to position a second UI element on the page. The instructions also cause the one or more processors to receive third user input via the layout application, in which the third user input indicates an instruction to create a connection from the second UI element to the first UI element. The instructions also cause the one or more processors to generate a layout constraint indicating a spatial relationship between the first UI element and the second UI element based on the connection. The instructions also cause the one or more processors to provide the layout constraint in a layout data file associated with the UI.

In one or more aspects, the user input indicates a defined distance between at least two of the two or more UI elements.

The instructions further cause the one or more processors to map the one or more connections to spatial positioning data and relationship data. In one or more aspects, the spatial positioning data indicates a location on the page with respect to a first UI element and a second UI element. In one or more aspects, the relationship data indicates a directional relationship between the first UI element and the second UI element with respect to one of the first UI element or the second UI element. The instructions further cause the one or more processors to determine coordinates on the page respectively for the first UI element and the second UI element based on the spatial positioning data and the relationship data. The instructions further cause the one or more processors to provide for display the first UI element and the second UI element at the determined coordinates.

The instructions further cause the one or more processors to process the spatial positioning data and the relationship data. The instructions further cause the one or more processors to determine whether the relationship data and the spatial positioning data are ambiguous based on the processing. In one or more aspects, the relationship data and the spatial positioning data are ambiguous when more than one potential set of coordinates can be calculated for at least one of the first UI element or the second UI element. The instructions further cause the one or more processors to resolve the relationship data and the spatial positioning data independent of a linear equation solver to determine the coordinates when it is determined that the relationship data and the spatial positioning data are not ambiguous. The instructions further cause the one or more processors to transform the relationship data and the spatial positioning data into one or more linear equations when it is determined that the relationship data and the spatial positioning data are ambiguous. The instructions further cause the one or more processors to resolve the one or more linear equations through the linear equation solver to determine the coordinates when the relationship data and the spatial positioning data are transformed into the one or more linear equations.

The instructions further cause the one or more processors to process the spatial positioning data and the relationship data. The instructions further cause the one or more processors to classify the relationship data and the spatial positioning data into a particular class of constraints. The instructions further cause the one or more processors to determine whether the particular class of constraints is associated with a first class of constraints or a second class of constraints different from the first class of constraints. The instructions further cause the one or more processors to resolve the relationship data and the spatial positioning data independent of a linear equation solver to determine the coordinates when it is determined that the particular class of constraints is associated with the first class of constraints. The instructions further cause the one or more processors to transform the relationship data and the spatial positioning data into one or more linear equations when it is determined that the particular class of constraints is associated with the second class of constraints. The instructions further cause the one or more processors to resolve the one or more linear equations through the linear equation solver to determine the coordinates when the relationship data and the spatial positioning data are transformed into the one or more linear equations.

The instructions further cause the one or more processors to provide for display a virtual object on the page. In one or more aspects, the virtual object is a visual guideline on the page. The instructions further cause the one or more processors to receive user input indicating an instruction to position at least one of the two or more UI elements relative to the virtual object. In one or more aspects, the spatial relationship between the two or more UI elements is based on the virtual object. The instructions further cause the one or more processors to render a final layout of the page based on the layout data file. In one or more aspects, the virtual object is removed from display on the page at runtime of the final layout.

According to an aspect of the present disclosure, a non-transitory computer readable storage medium is provided including instructions that, when executed by a processor, cause the processor to perform a method. The method includes providing, on a computing device, a layout application for developing a UI, in which the layout application includes a representation of a page. The method includes receiving first user input via the layout application, in which the first user input indicates an instruction to position a first UI element on the page. The method includes receiving second user input via the layout application, in which the second user input indicates an instruction to position a second UI element on the page. The method includes receiving third user input via the layout application, in which the third user input indicates an instruction to create a connection from the second UI element to the first UI element. The method includes generating a layout constraint indicating a spatial relationship between the first UI element and the second UI element based on the connection. The method also includes providing the layout constraint in a layout data file associated with the UI.

The instructions further cause the one or more processors to map each of the one or more connections to a linear equation that represents a spatial relationship between the first UI element and the second UI element. The instructions further cause the one or more processors to resolve the linear equation to produce a solution with a minimized amount of error in the one or more connections. The instructions further cause the one or more processors to determine coordinates on the page respectively for the first UI element and the second UI element based on the resolved linear equation. The instructions further cause the one or more processors to provide the determined coordinates to the layout data file.

The instructions further cause the one or more processors to provide for display a virtual object on the page, the virtual object being a visual guideline on the page. The instructions further cause the one or more processors to receive user input indicating an instruction to position one or more of the first UI element or the second UI element relative to the virtual object. In one or more aspects, the spatial relationship between the first UI element and the second UI element is based on the virtual object. The instructions further cause the one or more processors to render a final layout of the page based on the layout data file. In one or more aspects, the virtual object is removed from display on the page at runtime of the final layout.

According to an aspect of the present disclosure, a system is provided that includes means for storing instructions, and means for executing the stored instructions that, when executed by the means, cause the means to perform a method. The method includes providing, on a computing device, a layout application for developing a UI, in which the layout application includes a representation of a page. The method includes receiving first user input via the layout application, in which the first user input indicates an instruction to position a first UI element on the page. The method includes receiving second user input via the layout application, in which the second user input indicates an instruction to position a second UI element on the page. The method includes receiving third user input via the layout application, in which the third user input indicates an instruction to create a connection from the second UI element to the first UI element. The method includes generating a layout constraint indicating a spatial relationship between the first UI element and the second UI element based on the connection. The method also includes providing the layout constraint in a layout data file associated with the UI.

In generating the layout constraint, the method also includes mapping the connection to spatial positioning data and relationship data. In one or more aspects, the spatial positioning data indicates a location on the page with respect to the first UI element and the second UI element. In one or more aspects, the relationship data indicates a directional relationship between the first UI element and the second UI element with respect to one of the first UI element or the second UI element. The method also includes determining coordinates on the page respectively for the first UI element and the second UI element based on the spatial positioning data and the relationship data. The method also includes providing for display the first UI element and the second UI element at the determined coordinates.

In determining the coordinates, the method also includes processing the spatial positioning data and the relationship data. The method also includes determining whether the relationship data and the spatial positioning data are ambiguous based on the processing. In one or more aspects, the relationship data and the spatial positioning data are ambiguous when more than one potential set of coordinates can be calculated for at least one of the first UI element or the second UI element. The method also includes resolving the relationship data and the spatial positioning data independent of a linear equation solver to determine the coordinates when it is determined that the relationship data and the spatial positioning data are not ambiguous. The method also includes transforming the relationship data and the spatial positioning data into one or more linear equations when it is determined that the relationship data and the spatial positioning data are ambiguous. The method also includes resolving the one or more linear equations through the linear equation solver to determine the coordinates when the relationship data and the spatial positioning data are transformed into the one or more linear equations.

In determining the coordinates, the method also includes processing the spatial positioning data and the relationship data. The method also includes classifying the relationship data and the spatial positioning data into a particular class of constraints. The method also includes determining whether the particular class of constraints is associated with a first class of constraints or a second class of constraints different from the first class of constraints. The method also includes resolving the relationship data and the spatial positioning data independent of a linear equation solver to determine the coordinates when it is determined that the particular class of constraints is associated with the first class of constraints. The method also includes transforming the relationship data and the spatial positioning data into one or more linear equations when it is determined that the particular class of constraints is associated with the second class of constraints. The method also includes resolving the one or more linear equations through the linear equation solver to determine the coordinates when the relationship data and the spatial positioning data are transformed into the one or more linear equations.

In one or more aspects, the first UI element includes a first anchor and the second UI element includes a second anchor. The second anchor of the second UI element may be connected to the first anchor of the first UI element based on the instruction to create the connection from the second UI element to the first UI element.

In one or more aspects, the instruction to create the connection from the second UI element to the first UI element indicates that the first anchor and the second anchor occupy a same target location on the page.

In one or more aspects, the instruction to create the connection from the second UI element to the first UI element indicates a defined distance between the first anchor and the second anchor.

In generating the layout constraint, the method also includes determining that the connection includes an error. In one or more aspects, the error indicates that the first anchor and the second anchor are restricted from being positioned on a target location on the page. The method also includes modifying one or more dimensions of at least one of the first UI element or the second UI element. The method also includes reducing an amount of the error to a predetermined value based on the modified one or more dimensions.

The method also includes receiving a fourth user input indicating an instruction to position a third UI element on the page. The method also includes receiving a fifth user input indicating an instruction to create a first connection from the third UI element to the first UI element and a second connection from the third UI element to the second UI element. The method also includes determining that the position of the third UI element with respect to the first UI element and the second UI element includes an error. The method also includes modifying a ratio of an amount of error on the first connection to an amount of error on the second connection. The method also includes adjusting the amount of error on the first connection and the amount of error on the second connection based on the modified ratio. The method also includes determining coordinates for the third UI element based on the adjusted amount of error on the first connection and the adjusted amount of error on the second connection.

In one or more aspects, the layout constraint includes a first margin associated with the first connection from the third UI element to the first UI element and a second margin associated with the second connection from the third UI element to the second UI element. In one or more aspects, the first margin indicates a distance between the first UI element and third UI element and the second margin indicating a distance between the second UI element and the third UI element.

The method also includes providing for display a virtual object on the page, the virtual object being a visual guideline on the page. The method also includes receiving user input indicating an instruction to position one or more of the first UI element or the second UI element relative to the virtual object, the spatial relationship between the first UI element and the second UI element being based on the virtual object. The method also includes rendering a final layout of the page based on the layout data file. In one or more aspects, the virtual object is removed from display on the page at runtime of the final layout.

According to an aspect of the present disclosure, a computer-implemented method is provided. The method includes providing, on a computing device, a layout application for developing a UI, in which the layout application includes a representation of a page. The method includes receiving user input via the layout application, in which the user input indicates placement of two or more user interface elements on the page. The method includes detecting one or more connections between the two or more user interface elements. The method includes determining a layout constraint based on the one or more connections, in which the layout constraint indicates a spatial relationship between the two or more UI elements. The method also includes updating a layout data file associated with the UI to include the layout constraint.

According to an aspect of the present disclosure, a computer-implemented method is provided. The method includes providing, on a computing device, a layout application for developing a UI, in which the layout application includes a representation of a page. The method includes detecting one or more connections between a first UI element and a second UI element positioned on the page, in which each of the one or more connections indicates a layout constraint for the first UI element and the second UI element, and where the layout constraint indicates a spatial relationship between the two or more UI elements. The method includes determining whether the detected one or more connections include an error. The method includes adjusting the layout constraint to spread the error among the one or more connections when the detected one or more connections include an error. The method includes providing the layout constraint to a layout data file having a listing of constraints. The method also includes generating a final layout of the UI using the layout data file.

In one or more aspects, examples of clauses are described below.

A method comprising one or more methods, operations or portions thereof described herein.

An apparatus comprising one or more memories and one or more processors (e.g., 110), the one or more processors configured to cause performing one or more methods, operations or portions thereof described herein.

An apparatus comprising one or more memories (e.g., 220, one or more internal, external or remote memories, or one or more registers) and one or more processors (e.g., 212) coupled to the one or more memories, the one or more processors configured to cause the apparatus to perform one or more methods, operations or portions thereof described herein.

An apparatus comprising means (e.g., 110) adapted for performing one or more methods, operations or portions thereof described herein.

A processor (e.g., 212) comprising modules for carrying out one or more methods, operations or portions thereof described herein.

A hardware apparatus comprising circuits (e.g., 110) configured to perform one or more methods, operations or portions thereof described herein.

An apparatus comprising means (e.g., 110) adapted for performing one or more methods, operations or portions thereof described herein.

An apparatus comprising components (e.g., 110) operable to carry out one or more methods, operations or portions thereof described herein.

A computer-readable storage medium (e.g., 220, one or more internal, external or remote memories, or one or more registers) comprising instructions stored therein, the instructions comprising code for performing one or more methods or operations described herein.

A computer-readable storage medium (e.g., 220, one or more internal, external or remote memories, or one or more registers) storing instructions that, when executed by one or more processors, cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It may be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor may they be interpreted in such a way.

What is claimed is:

1. A method comprising:
   determining, by a computing device, a plurality of connections involving at least a first user interface (UI) element, a second UI element, and a third UI element, wherein the plurality of connections include at least a first layout constraint and a second layout constraint, wherein the first layout constraint defines a spatial relationship between the first UI element and the second UI element, and wherein the second layout constraint defines a spatial relationship between the second UI element and the third UI element;
   determining, by the computing device, that the plurality of connections result in an error in positioning of the first UI element, the second UI element, or the third UI element;
   determining, by the computing device, a ratio of an amount of error to spread to the first layout constraint to an amount of error to spread to the second layout constraint; and
   adjusting, by the computing device, the first layout constraint and the second layout constraint to spread the error to the first layout constraint and the second layout constraint, wherein the error is spread according to the determined ratio.

2. The method of claim 1, wherein determining the plurality of connections involving the first UI element, the second UI element, and the third UI element comprises:
providing, on the computing device, a layout application for developing a UI, the layout application including a representation of a page that allows UI elements to be visually positioned relative to each other; and
receiving, via the layout application, user input indicating the plurality of connections involving the first UI element, the second UI element, and the third UI element.

3. The method of claim 2, further comprising after adjusting the first layout constraint and the second layout constraint, providing the first layout constraint and the second layout constraint in a layout data file associated with the UI.

4. The method of claim 1, further comprising modifying one or more dimensions of the first UI element, the second UI element, or the third UI element to facilitate spread of the error to the first layout constraint and the second layout constraint.

5. The method of claim 1, wherein determining the ratio is based on user input.

6. The method of claim 1, wherein determining the ratio is based on user preferences stored in memory of the computing device.

7. The method of claim 1, wherein determining the ratio comprises the computing device modifying a predetermined ratio value to a customized ratio value.

8. The method of claim 1, further comprising determining coordinates for the first UI element, the second UI element, or the third UI element based on the ratio of the amount of error to spread to the first layout constraint to the amount of error to spread to the second layout constraint.

9. The method of claim 1, further comprising generating a final layout of a UI based on the first adjusted layout constraint and the second adjusted layout constraint.

10. The method of claim 1, wherein adjusting the first layout constraint and the second layout constraint to spread the error to the first layout constraint and the second layout constraint is performed using a linear equation solver.

11. The method of claim 10, wherein the linear equation solver is applied responsive to a determination that more than one potential set of coordinates can be calculated for at least one of the first UI element, the second UI element, or the third UI element.

12. The method of claim 10, wherein the linear equation solver is applied to a linear equation representing two opposite-connected anchors on one of the first UI element, the second UI element, or the third UI element.

13. The method of claim 12, wherein the linear equation solver spreads the error equally among the two opposite-connected anchors.

14. The method of claim 12, wherein the linear equation solver spreads the error such that more error is applied to a first anchor of the two opposite-connected anchors than to a second anchor of the two opposite-connected anchors.

15. A non-transitory computer readable storage medium is provided that includes instructions that, when executed by at least one processor, cause the at least one processor to:
determine a plurality of connections involving at least a first user interface (UI) element, a second UI element, and a third UI element, wherein the plurality of connections include at least a first layout constraint and a second layout constraint, wherein the first layout constraint defines a spatial relationship between the first UI element and the second UI element, and wherein the second layout constraint defines a spatial relationship between the second UI element and the third UI element;
determine that the plurality of connections result in an error in positioning of the first UI element, the second UI element, or the third UI element;
determine a ratio of an amount of error to spread to the first layout constraint to an amount of error to spread to the second layout constraint; and
adjust the first layout constraint and the second layout constraint to spread the error to the first layout constraint and the second layout constraint, wherein the error is spread according to the determined ratio.

16. A system, comprising:
one or more processors;
a computer-readable storage medium coupled to the one or more processors, the computer-readable storage medium including instructions that, when executed by the one or more processors, cause the one or more processors to:
determine a plurality of connections involving at least a first user interface (UI) element, a second UI element, and a third UI element, wherein the plurality of connections include at least a first layout constraint and a second layout constraint, wherein the first layout constraint defines a spatial relationship between the first UI element and the second UI element, and wherein the second layout constraint defines a spatial relationship between the second UI element and the third UI element;
determine that the plurality of connections result in an error in positioning of the first UI element, the second UI element, or the third UI element;
determine a ratio of an amount of error to spread to the first layout constraint to an amount of error to spread to the second layout constraint; and
adjust the first layout constraint and the second layout constraint to spread the error to the first layout constraint and the second layout constraint, wherein the error is spread according to the determined ratio.

17. The system of claim 16, wherein the instructions cause the one or more processors to determine the plurality of connections involving the first UI element, the second UI element, and the third UI element by:
providing a layout application for developing a UI, the layout application including a representation of a page that allows UI elements to be visually positioned relative to each other; and
receiving, via the layout application, user input indicating the plurality of connections involving the first UI element, the second UI element, and the third UI element.

18. The system of claim 17, wherein the instructions cause the one or more processors to provide a visual indication of the first adjusted layout constraint and the second adjusted layout constraint in the layout application.

19. The system of claim 16, wherein the instructions cause the one or more processors to generating a final layout of a UI based on the first adjusted layout constraint and the second adjusted layout constraint.

* * * * *